(12) United States Patent
Kapoor et al.

(10) Patent No.: US 10,078,670 B2
(45) Date of Patent: *Sep. 18, 2018

(54) ELECTRONIC TEMPLATE GENERATION, DATA EXTRACTION AND RESPONSE DETECTION

(71) Applicant: Pearson Education, Inc., New York, NY (US)

(72) Inventors: Vishal Kapoor, Iowa City, IA (US); Miles Loring, North Liberty, IA (US); Cole Cecil, Coralville, IA (US); Jesse Peterson, Upper Saddle River, NJ (US); Umamakeswaran Veerasingam, Coralville, IA (US); Sanjay Zope, Freemont, CA (US)

(73) Assignee: PEARSON EDUCATION, INC., Upper Saddle River, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/294,366

(22) Filed: Oct. 14, 2016

(65) Prior Publication Data
US 2017/0031999 A1    Feb. 2, 2017

Related U.S. Application Data

(63) Continuation of application No. 14/640,953, filed on Mar. 6, 2015, now Pat. No. 9,507,792, which is a
(Continued)

(51) Int. Cl.
| | | |
|---|---|---|
| *G06F 17/30* | (2006.01) | |
| *G06K 9/00* | (2006.01) | |
| *G06K 9/62* | (2006.01) | |

(52) U.S. Cl.
CPC .... *G06F 17/30536* (2013.01); *G06F 17/3053* (2013.01); *G06F 17/30076* (2013.01);
(Continued)

(58) Field of Classification Search
CPC ......... G06F 17/30536; G06F 17/30879; G06F 17/3089; G06F 17/30076; G06K 9/00442; G06K 9/6202
See application file for complete search history.

(56) References Cited

U.S. PATENT DOCUMENTS

| | | |
|---|---|---|
| 6,105,042 A | 8/2000 | Aganovic et al. |
| 9,099,007 B1 | 8/2015 | Abumov |
| (Continued) | | |

OTHER PUBLICATIONS

Al Yahya, M., "Ontology-Based Multiple Choice Question Generation." Hindawi: The Scientific World Journal. Hindawi, Mar. 26, 2014. Web. Accessed at <http://www.hindawi.com/journals/tswj/2014/274949/> on May 19, 2015. 8 pages.
(Continued)

*Primary Examiner* — Tarek Chbouki
(74) *Attorney, Agent, or Firm* — Kilpatrick Townsend & Stockton LLP

(57) ABSTRACT

A file receiver receives an electronic structure file that includes structure-file data associated with a spatial arrangement and detects a content object for processing that includes content-object data. A file transformation engine transforms the structure-file data from the structure file into an electronic record. A rendering engine renders an image of the transformed structure-file data arranged in the spatial arrangement. An interface engine detects an input corresponding to specification of a position of a data segment. A parsing engine defines a segment-position specification indicative of the position. A template engine generates an electronic template that associates an identifier of the data segment with the segment-position specification and associates the electronic template with a template identifier. A record classifier determines that the content object corresponds to the template identifier. The parsing engine further
(Continued)

extracts, using the segment-position specification, a portion of the content-object data that corresponds to the data segment.

18 Claims, 13 Drawing Sheets

Related U.S. Application Data continuation of application No. 14/640,597, filed on Mar. 6, 2015, now Pat. No. 9,311,048.

(52) U.S. Cl.
CPC .... *G06F 17/3089* (2013.01); *G06F 17/30138* (2013.01); *G06F 17/30554* (2013.01); *G06F 17/30879* (2013.01); *G06K 9/00442* (2013.01); *G06K 9/6202* (2013.01)

(56) References Cited

U.S. PATENT DOCUMENTS

| | | |
|---|---|---|
| 9,311,048 B1 | 4/2016 | Kapoor et al. |
| 9,507,792 B2 | 11/2016 | Kapoor et al. |
| 2006/0014129 A1* | 1/2006 | Coleman ............ G09B 7/02 434/322 |
| 2008/0227075 A1 | 9/2008 | Poor |
| 2012/0102386 A1 | 4/2012 | Campbell et al. |
| 2012/0189999 A1* | 7/2012 | Uthman ............ G09B 7/02 434/335 |
| 2014/0335497 A1 | 11/2014 | Gal et al. |
| 2015/0040002 A1 | 2/2015 | Kannan et al. |
| 2015/0058362 A1 | 2/2015 | Manohar et al. |
| 2015/0235564 A1* | 8/2015 | Lynch ............ G09B 7/077 434/362 |
| 2015/0364049 A1* | 12/2015 | Smith ............ G09B 5/12 434/319 |
| 2016/0180733 A1* | 6/2016 | Foley, Jr. ............ G09B 7/00 434/320 |

OTHER PUBLICATIONS

Papasalouros, A., et al., "Automatic Generation of Multiple Choice Questions from Domain Ontologies." IADIS International Conference e-Learning, 2008. Accessed at <http://www.researchgate.net/publication/220969955_Automatic_Generation_Of_Multiple_Choice_Questions_From_Domain_Ontologies> on May 19, 2015. 8 pages.
U.S. Appl. No. 14/640,597, filed Mar. 6, 2015 by Pearson Education, Inc., all pages.
Preinterview First Office Action dated Apr. 20, 2015 for U.S. Appl. No. 14/640,597, filed Mar. 6, 2015 by Pearson Education, Inc., all pages.
First Action Interview Office Action dated Jun. 24, 2015 for U.S. Appl. No. 14/640,597, filed Mar. 6, 2015 by Pearson Education, Inc., all pages.
Final Office Action dated Sep. 21, 2015 for U.S. Appl. No. 14/640,597, filed Mar. 6, 2015 by Pearson Education, Inc., all pages.
Notice of Allowance dated Dec. 4, 2015, for U.S. Appl. No. 14/640,597, 597, filed Mar. 6, 2015 by Pearson Education, Inc., 13 pages.
U.S. Appl. No. 14/640,953, filed Mar. 6, 2015 by Pearson Education, Inc., 73 pages.
Notice of Publication dated Sep. 9, 2016 for U.S. Appl. No. 14/640,953, filed Mar. 6, 2015 by Pearson Education, Inc., 1 page.
Notice of Allowance dated Jul. 18, 2016 for U.S. Appl. No. 14/640,953, filed Mar. 6, 2015 by Pearson Education, Inc., 20 pages.
First Action Interview dated Apr. 26, 2016 for U.S. Appl. No. 14/640,953, filed Mar. 6, 2015 by Pearson Education, Inc ., 10 pages.

\* cited by examiner

ELECTRONIC TEMPLATE GENERATION, DATA EXTRACTION AND RESPONSE DETECTION

CROSS-REFERENCE TO RELATED APPLICATIONS

This application is a continuation of U.S. application Ser. No. 14/640,953, filed on Mar. 6, 2015, which is a continuation of U.S. application Ser. No. 14/640,597, filed on Mar. 6, 2015. Each of these applications is hereby incorporated by reference in its entirety for all purposes.

BACKGROUND

Automated data extraction and analysis of content objects provides a number of advantages. For example, such an automated approach can improve an efficiency, accuracy and consistency of processing. However, such automation relies on being able to appropriately identify which data elements are to be extracted for subsequent analysis.

BRIEF SUMMARY

Certain embodiments relate to techniques for establishing an electronic template that includes a segment-position specification that identifies, in a first coordinate system, an absolute or relative position of each of one or more particular data segments. A content object can be received and, in some instances, may be of or have one of various file types, alignments, skews and/or zooms. A content management system can classify the content object to determine that the electronic template is applicable for processing of the object. One of more portions of data can be extracted from the content object (or processed version thereof), with each portion corresponding to a segment-position specification identified in the template. In some instances, a transformation of the one or more segment-position specifications and/or of the content object is performed such that, for example, a file type, coordinate system, zoom, alignment and/or skew of the content-object data matches that corresponding to the one or more segment-position specifications.

An extracted portion can include a set of pixel intensities, which can be analyzed to detect a response as indicated in the portion. For example, one analysis can include classifying a response (e.g., marked or not; or identifying a marked option) and/or determining marking was present. Given that content objects may vary with regard to a baseline intensity, this analysis may include a relative analysis, such as determining a ratio of an average pixel intensity within a portion relative to an average pixel intensity across content-object and comparing the ratio to a threshold.

In some instances, a data-segment portion is presented along with one or more tools to facilitate in identifying a response in the portion. For example, portions associated with evaluation quality metrics below a quality threshold may be presented along with response identifications and a tool configured to accept input that rejects or overrides the response identification. As another example, portions with semantic content can be presented along with a tool that accepts input identifying a score for the content (e.g., a numeric score).

In some embodiments, a content management system for generating electronic templates and using the electronic templates to identify portions of data to extract from content objects is provided. A file receiver receives an electronic structure file that includes structure-file data associated with a spatial arrangement and detects a content object for processing that includes content-object data. A file transformation engine transforms the structure-file data from the structure file into an electronic record. The transformed structure-file data including a representation of the spatial arrangement. A rendering engine renders an image of the transformed structure-file data arranged in the spatial arrangement. An interface engine detects an input corresponding to specification of a position of a data segment. A parsing engine defines a segment-position specification indicative of the position of the data segment. A template engine generates an electronic template that associates an identifier of the data segment with the segment-position specification and associates the electronic template with a template identifier. A record classifier determines that the content object for processing corresponds to the template identifier. The parsing engine further extracts, using the segment-position specification, a portion of the content-object data that corresponds to the data segment.

In some embodiments, a method for generating electronic templates and using the electronic templates to identify portions of data to extract from content objects is provided. An electronic structure file is received that includes structure-file data associated with a spatial arrangement. The structure-file data is transformed from the structure file into an electronic record. The transformed structure-file data can include a representation of the spatial arrangement. An image of the transformed structure-file data arranged in the spatial arrangement is rendered. An input corresponding to specification of a position of a data segment is detected. A segment-position specification indicative of the position of the data segment is defined. An electronic template that associates an identifier of the data segment with the segment-position specification is generated. The electronic template is associated with a template identifier. A content object for processing that includes content-object data is detected. It is determined that the content object for processing corresponds to the template identifier. Using the segment-position specification, a portion of the content-object data that corresponds to the data segment is extracted.

In some embodiments, a content management system for extracting portions of content objects for semi-automated response identifications is provided. A file receiver detects a content object for processing that includes content-object data arranged according to a spatial arrangement. The content object is associated with a user identifier. A record classifier determines that the content object for processing corresponds to a template identifier associated with a segment-position specification for a data segment. A parsing engine identifies a portion of the content-object data as corresponding to the data segment based on the segment-position specification and the spatial arrangement and extracts the portion of the content-object data. A response classifier evaluates the portion of the content-object data to identify a response indicated in the portion of the content-object data and determines an evaluation quality metric reflecting a confidence in the identification of the response. The response classifier further determines whether a quality criterion is satisfied based on the evaluation quality metric. An interface engine that, when the quality criterion is not satisfied: facilitates a presentation that includes the portion of the content-object data; and receives input corresponding to an identification of the response. The response classifier further stores, upon receiving the input corresponding to an identification of the response, the identification of the response corresponding to the input or a processed version thereof, in association with the user identifier.

Evaluating the portion of the content-object data can include determining a statistic based on a set of pixel intensities and comparing the statistic to a threshold. The system may further include a file transformation engine that transforms the segment-position specification from a first coordinate system to a second coordinate system. The second coordinate system can be one associated with the content object. The system can further include a file transformation engine that transforms the content-object data from the content object into an electronic object record. The transformed content-object data can include a representation of the spatial arrangement. The parsing engine can identify the portion of the content-object data using the electronic record. The system can also include a document type classifier that detects a document type of the content object. Transforming the content-object data into the electronic record can include converting the content object to a file of a target document type. The file can include the transformed content-object data. The presentation further can include a second portion of content-object data extracted from a second content object associated with a second user identifier. The second portion of content-object can correspond to the data segment. When it is determined that the quality criterion is satisfied, the response classifier can further store the identification of the response as identified based on the evaluation in association with the user identifier. The presentation need not include the user identifier or any other identifier of a user associated with the user identifier. The evaluation of the portion of the content-object data further can include determining whether or an extent to which the identified response corresponds to a target data element associated with the data segment.

In some embodiments, a computer-implemented method for extracting portions of content objects for semi-automated response identifications is provided. A content object for processing that includes content-object data arranged according to a spatial arrangement is detected. The content object is associated with a user identifier. A determination is made that the content object for processing corresponds to a template identifier associated with segment-position specification for a data segment. A portion of the content-object data is identified as corresponding to the data segment based on the segment-position specification and the spatial arrangement. The portion of the content-object data is extracted. The portion of the content-object data is evaluated to identify a response indicated in the portion of the content-object data. An evaluation quality metric is determined that reflects a confidence in the identification of the response. A determination is made as to whether a quality criterion is satisfied based on the evaluation quality metric. When the quality criterion is not satisfied: a presentation that includes the portion of the content-object data is facilitated and input is received that corresponds to an identification of the response. Upon receiving the input corresponding to an identification of the response, the identification of the response corresponding to the input or a processed version thereof is stored in association with the user identifier.

Evaluating the portion of the content-object data can include determining a statistic based on a set of pixel intensities and comparing the statistic to a threshold. The method can further include transforming the segment-position specification from a first coordinate system to a second coordinate system. The second coordinate system can be one associated with the content object. The method can also include transforming the content-object data from the content object into an electronic object record, the transformed content-object data including a representation of the spatial arrangement. The portion of the content-object data can be identified using the electronic record. The method may further include detecting a document type of the content object. Transforming the content-object data into the electronic record can include converting the content object to a file of a target document type, the file including the transformed content-object data. The presentation can further include a second portion of content-object data extracted from a second content object associated with a second user identifier, the second portion of content-object corresponding to the data segment. When it is determined that the quality criterion is satisfied, the identification of the response as identified based on the evaluation can be stored in association with the user identifier. The presentation need not include the user identifier or any other identifier of a user associated with the user identifier. The evaluation of the portion of the content-object data can further include determining whether or an extent to which the identified response corresponds to a target data element associated with the data segment.

In some embodiments, a computer-program product tangibly embodied in a non-transitory machine-readable storage medium is provided. The computer-program product can include instructions configured to cause one or more data processors to perform actions including those of a method disclosed herein.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
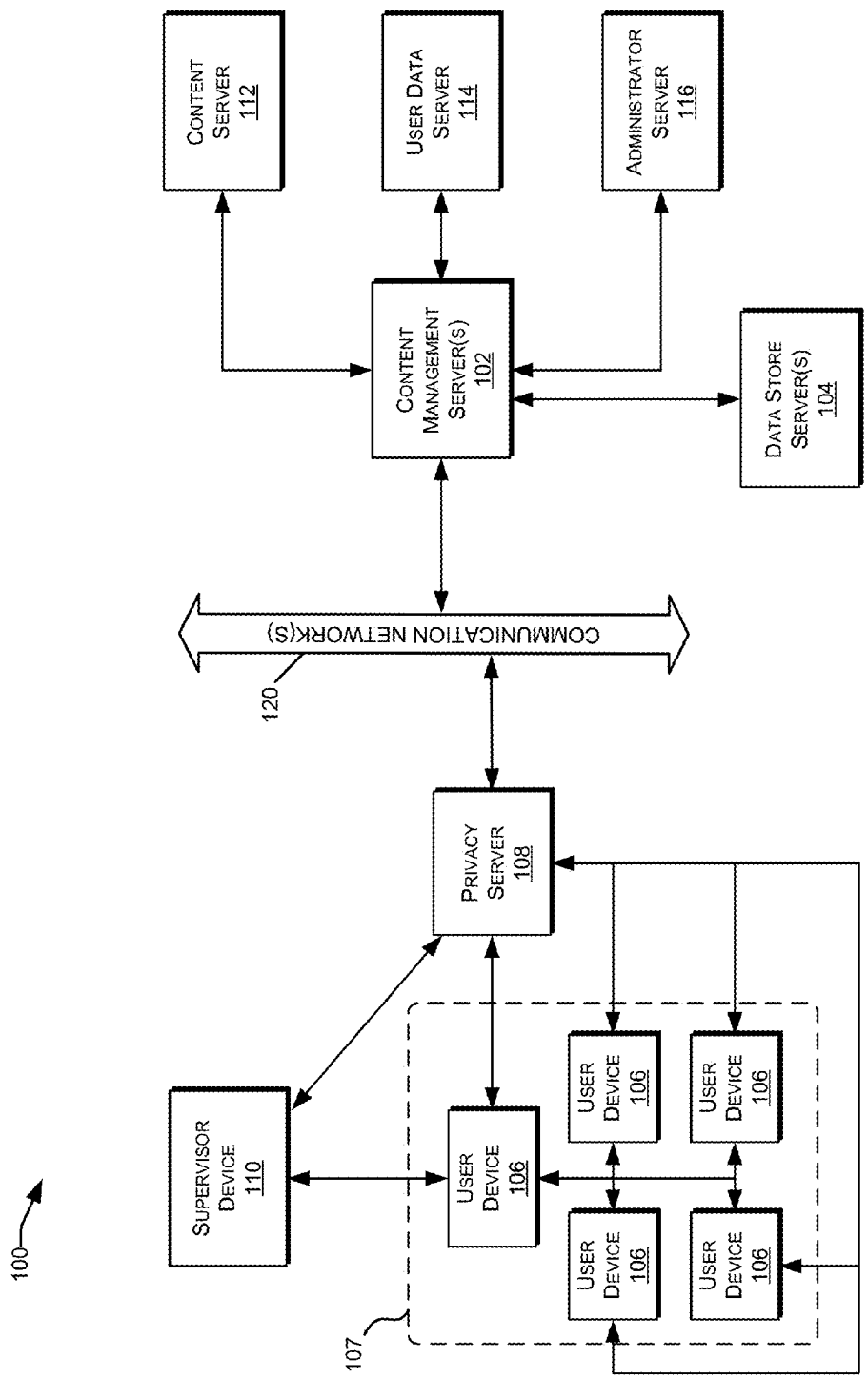
FIG. 1 is a block diagram showing illustrating an example of a content distribution network.

With reference now to FIG. 1, a block diagram is shown illustrating various components of an embodiment of content distribution network 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, a processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, also referred to herein as data stores. Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single data store server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as thin-client computers, Internet-enabled gaming system, business or home appliances, and/or personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 112, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
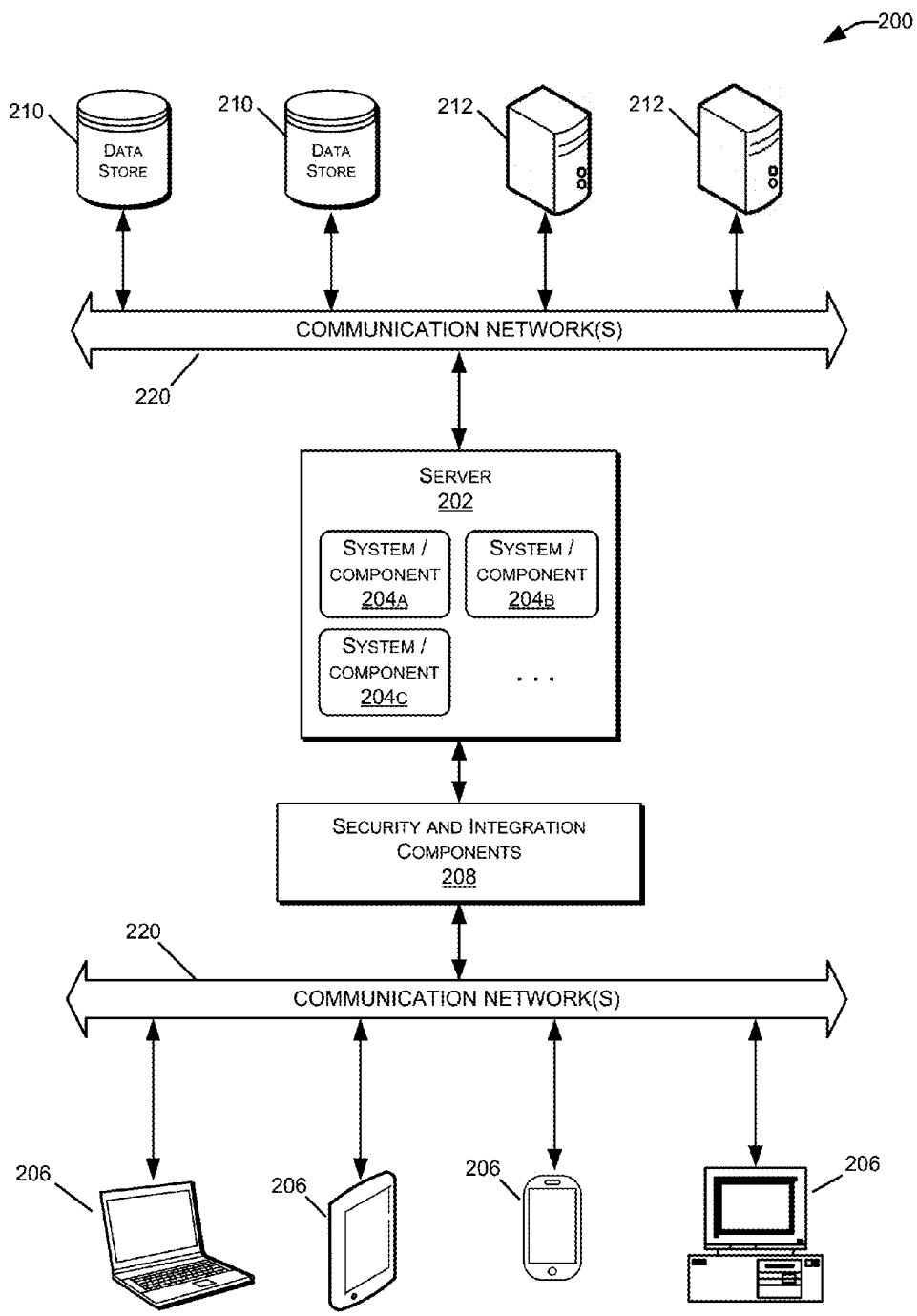
FIG. 2 is a block diagram illustrating a computer server and computing environment within a content distribution network.

With reference to FIG. 2, an illustrative distributed computing environment 200 according to an embodiment is shown including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204 may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as the Web Service Interoperability (WS-I) guidelines. For example, some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using the WS-Security standard, which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN).

Figure 3:
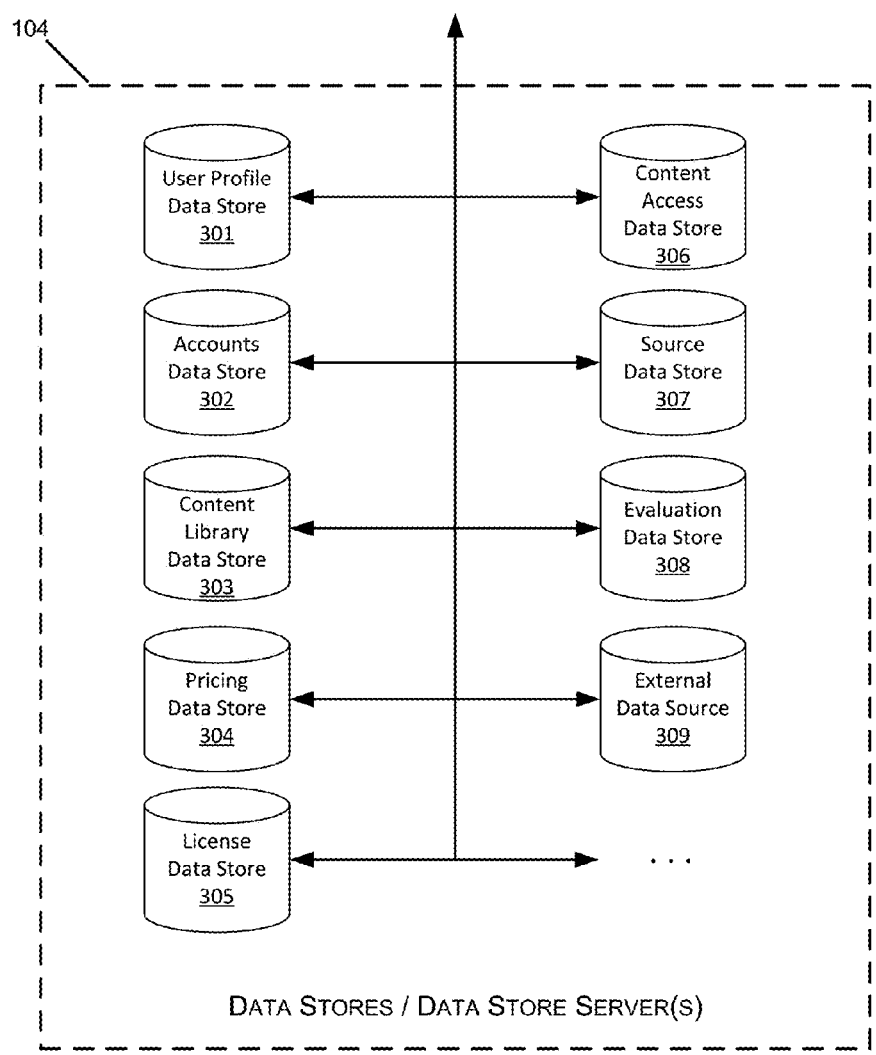
FIG. 3 is a block diagram illustrating an embodiment of one or more data store servers within a content distribution network.

With reference to FIG. 3, an illustrative set of data stores and/or data store servers according to an embodiment is shown, corresponding to the data store servers 104 of the content distribution network 100 discussed above in FIG. 1. One or more individual data stores 301-309 may reside in storage on a single computer server 104 (or a single server farm or cluster) under the control of a single entity, or may reside on separate servers operated by different entities and/or at remote locations. In some embodiments, data stores 301-309 may be accessed by the content management server 102 and/or other devices and servers within the network 100 (e.g., user devices 106, supervisor devices 110, administrator servers 116, etc.). Access to one or more of the data stores 301-309 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-309, including their functionality and types of data stored therein, are illustrative and non-limiting. Data store server architecture, design, and the execution of specific data stores 301-309 may depend on the context, size, and functional requirements of a content distribution network 100. For example, in content distribution systems 100 used for professional training and educational purposes, separate data stores may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data store server(s) 104 to store listing of available content titles and descriptions, content title usage statistics, subscriber profiles, account data, payment data, network usage statistics, etc.

A user profile data store 301 may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.).

An accounts data store 302 may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303 may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage and. In other cases, pricing may be tied to specific content resources. Certain content resources may have associated pricing information, whereas other pricing determinations may be based on the resources accessed, the profiles and/or accounts of the users, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned roles and/or levels of access to users. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

In addition to the illustrative data stores described above, data store server(s) 104 may include one or more external data aggregators 309. External data aggregators 309 may include third-party data sources accessible to the content management network 100, but not maintained by the content management network 100. External data aggregators 309 may include any electronic information source relating to the users, content resources, or applications of the content distribution network 100. For example, external data aggregators 309 may be third-party data stores containing demographic data, education related data, consumer sales data, health related data, and the like. Illustrative external data aggregators 309 may include, for example, social networking web servers, public records data stores, learning management systems, educational institution servers, business servers, consumer sales data stores, medical record data stores, etc. Data retrieved from various external data aggregators 309 may be used to verify and update user account information, suggest user content, and perform user and content evaluations.

Figure 4:
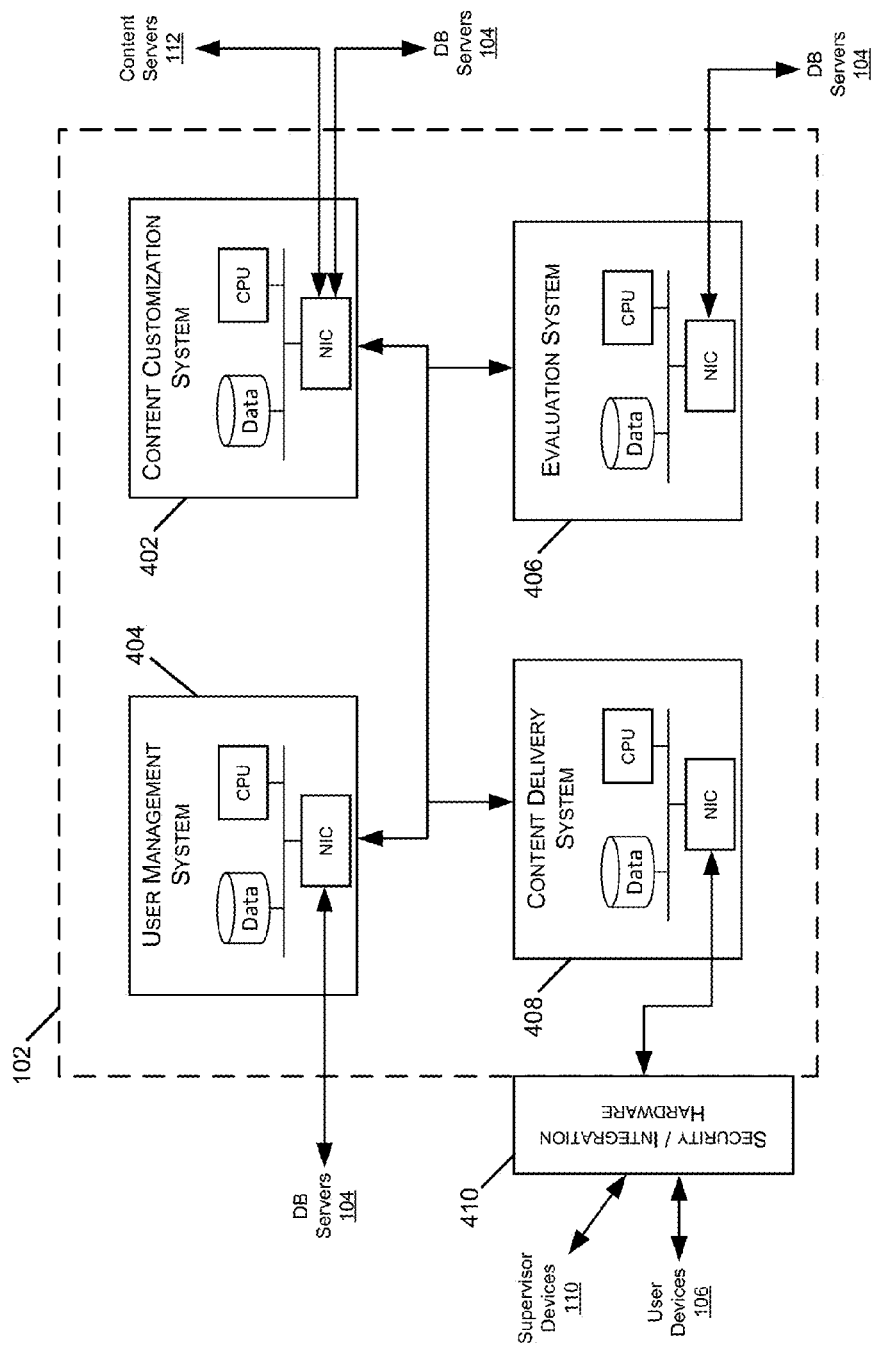
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more data stores and servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
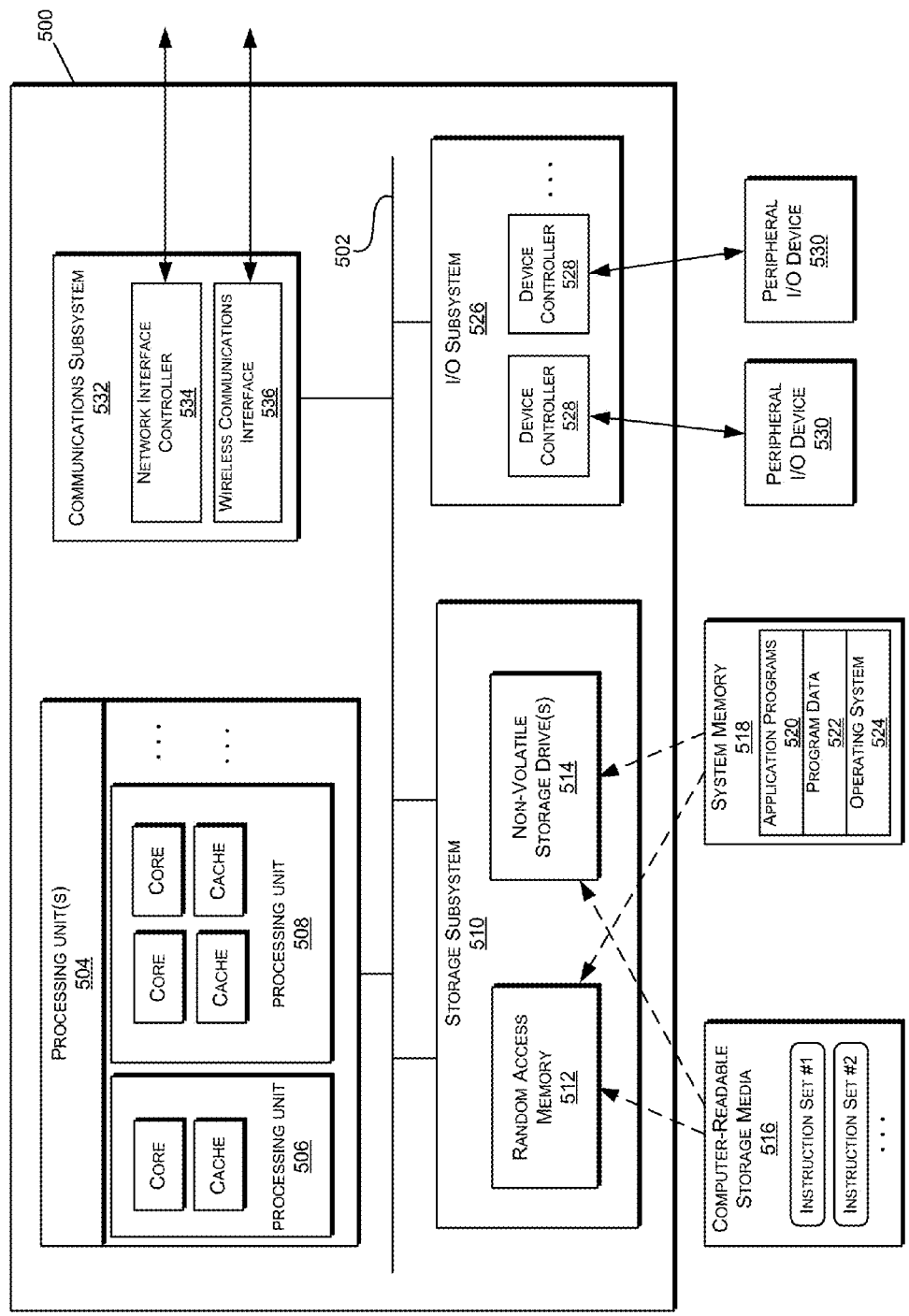
FIG. 5 is a block diagram illustrating the physical and logical components of a special-purpose computer device within a content distribution network.

With reference now to FIG. 5, a block diagram of an illustrative computer system 500 according to an embodiment is shown. System 500 may correspond to any of the computing devices or servers of the content distribution network 100 described above, or any other computing devices described herein. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater.

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 318 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 309). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

Figure 6:
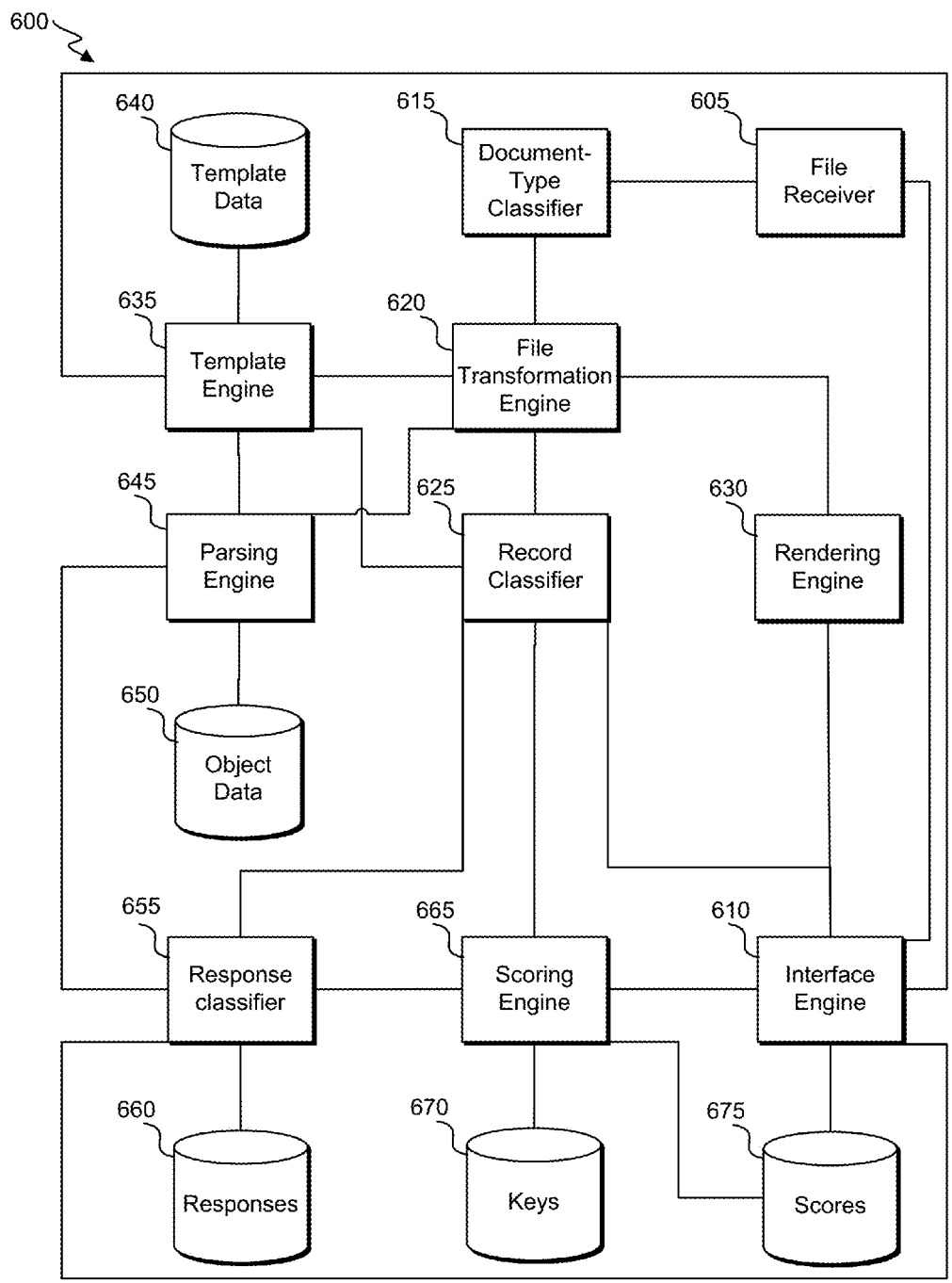
FIG. 6 is a block diagram of an embodiment of a content management system.

With reference now to FIG. 6 a block diagram of an embodiment of a content management system 600 is shown. Part or all of content management system 600 may be part of a device or server disclosed herein, such as a computing device or server of the content distribution network 100 (e.g., content management server 102, data store server 104, content server 112, user data server 114 and/or administrator server 116). In some instances, part or all of content management system 600 is in the cloud. In some instances, content management system 600 is a distributed system, where different components or different parts of a component are present on different devices and/or where a single component or component part is present on each of multiple devices.

Content management system 600 includes a file receiver 605 that detects a file. The file can include an uploaded file, one received from another device and/or one generated based on input (and/or other) data. For example, file receiver 605 may be part of a supervisor device or user device and may receive the file per an upload facilitated by an interface engine 610. For example, interface engine 610 may generate and present a graphical user interface that indicates that a file can be uploaded an includes an upload tool that allows a user to identify a file path (or determines a file path based on corresponding input). The file can be retrieved using the file path and transmitted to a remote server (e.g., which may receive the file via a file receiver 605 at the server) or made accessible to a software component to process locally. As another example, interface engine 610 may be configured to receive data and/or specifications for a file (e.g., text, graphics or other content to be included; and/or spacing and/or alignment specifications). The data and/or specifications may correspond to GUI input. A file can be generated (e.g., via an application or a content server 112 or content component) in accordance with the data and/or specifications.

The file can include a document or content object of one of various types, such as, for example, an image file (e.g., a gif, jpg, tiff or png file), a portable document format file (e.g., a pdf file), a word-processing file (e.g., a doc, docx, pages or wps file), a spreadsheet file (e.g., an xls, xlsx or csv file), a text file (e.g., a txt file) or a presentation file (e.g., a ppt, pptx or key file). In some instances, multiple types of files can be accepted for processing. The file can include one generated via (e.g., having content detected by) a camera, scanner or other peripheral or integrated component included in and/or connected to a device (e.g., a user or supervisor device).

A document-type classifier 615 can detect a document type of the received file and/or one or more other characteristics. The detection of the document type can include, for example, identifying an application from which the file was received, identifying an application that generated the file, analyzing metadata of the file, analyzing header data of the file, identifying a file extension, identifying a data format. The detection of the document type can include, for example, identifying a particular document type (e.g., corresponding to a particular extension) or identifying a more general document type (e.g., an image type).

The one or more other characteristics can include, for example, detecting one or more dimensions of a rendered version of the file, detecting a skew, detecting a zoom and/or detecting a file size. The one or more other characteristics can be detected by, for example, detecting file properties (e.g., attributes or other metadata) and/or by analyzing content in the file. For example, it may be assumed that baseline file dimensions are to be that of a defined size (e.g., 8½ by 11). A zoom can then be estimated based on how dimensions of a rendered version of a file compare to the baseline dimensions or based on how dimensions of part of a rendered version of a file (e.g., that surrounded by page demarcations) compare to the baseline dimensions. Similarly, a skew can be estimated based on how a shape of all or part of a rendered version of a file compares with a reference shape (e.g., a rectangle with a defined aspect ratio). The one or more other characteristics can alternatively or also be detected based on an analysis of file contents. For example, a rendered version of a file may include a reference marking. A size, skew, intensity variance or other property of the rendered marking can be compared to a corresponding defined reference property to estimate a zoom, skew, etc. In some instances, metadata, file properties or file content can be used to identify a coordinate space and/or one or more axes of the file.

A file transformation engine 620 can process a received file to transform data from the file. The transformation can include generating a new file or modifying the received file. In the former instance, the new file may be generated so as to include some or all of the metadata from the received data.

The transformation can be configured such that transformed data have one or more specifications that match one or more defined specifications. For example, a file may be transformed to have a desired file type, zoom, skew, size, or pixel intensity distribution characteristic (e.g., mean, median, standard deviation or mode intensity). As another example, a file may be transformed such that a rendered version of the file will align with a reference coordinate space (e.g., having edges align with axes in the reference coordinate space). To illustrate, a file may be transformed to remove or reduce any tilt or skewing and/or to change a zoom such that a width of the transformed document matches a defined width value.

It will be appreciated that a received file can include data associated with a spatial arrangement. For example, data may include a pixel intensity values and corresponding locations. As another example, data may include one or more words, symbols, numbers or graphics and a corresponding location. (In some instances, the transformation includes converting pixel intensities into words, symbols and/or numbers.)

The transformation can be performed in a manner to preserve information about the spatial arrangement. For example, adjusting a zoom, skew or size of a file can preserve the positions of letters, words, numbers, graphics and/or pixels of various intensities relative to each other. For example, a received file may be configured such that, in a rendered version, a first word is 1 cm below a second word and 2 cm above a third word. The file may be transformed to double a zoom, and a rendered version of the transformed data may preserve locating the second word between the third and first words and include a separation distance between the second and third word that is double that between the first and second words. In some instances, adjusting a zoom, file type, skew or other characteristic may require interpolating pixel intensity (and/or color) values.

A record classifier 625 can generate or detect a template identifier corresponding to a file. The template identifier can include, for example, a code (e.g., an alphanumeric code, a numeric code, a bar code, or a QR code), a document title or a document header (e.g., that includes a code, document title, source identifier, and/or date). Whether a template identifier is to be generated or detected can depend on a source of a file (e.g., such that template identifiers are to be detected when a file is received from a user device and/or generated when received from a supervisor device), whether an identifier is included in metadata or content of the received file (e.g., generating the identifier when none is detected), and/or whether or what input was received (e.g., generating a template identifier in response to detecting input requesting template-identifier generation).

The template-identifier generation or detection can occur, in various instances, before or after transformation of a file. Performing the generation or detection of the template identifier after the transformation may allow record classifier 625 to search for or generate a code of a prescribed size. Performing the generation or detection before the transformation may allow file transformation engine 620 to use characteristics of the detected code to influence file transformations. For example, it may be known that a code is to have a defined width and shape and a defined orientation of the shape. File transformation engine 620 can determine a transformation that is to occur based on a comparison between a size and orientation of a detected identifier with those prescribed.

When a template identifier is to be generated, the generation may occur using a pseudo-random selection technique, or the identifier may be generated based on pertinent data. For example, part or all of the identifier may be indicative of or identify a source device, a supervisor or user corresponding to a source device, a course and/or a date.

In some instances, a received file is a structure file, which can include a file that is to be used to generate a template, define data-segment positions and/or sizes (e.g., where responses are to be present) and/or to define part or all of a key. In some instances, a received file is a content object, which can include a file that is to be processed using a template, having content that is to be extracted and/or having content that is to be evaluated. Record classifier 625 may, in some instances, distinguish between these file types. For example, record classifier 625 may detect that a file is a structure file when it is received from a supervisor device, when an input is detected that identifies the file as a structure file, and/or when the file lacks a template identifier or includes a template identifier not matching those in part or all of a data store.

In some instances, a rendering engine 630 renders a file. Such rendering can include rendering the received file or a transformed version thereof, such that data from the file (e.g., the received file or a transformed version thereof) is included in a presentable form (e.g., an image). For example, a received file can be rendered such that an image representing a page, a portion of a page or multiple pages is generated, that includes content on the page(s) or portion in a spatial arrangement (e.g., corresponding to that from the file). For example, a received file can include a scanned document, with questions 1-4 being arranged sequentially along a page, and with blank spaces separating the pages. The rendered version of the page can include these same spatial-arrangement features. As another example, a received file can include a word-processing or spreadsheet document that includes content organized in paragraphs or tables, and the rendered version can match how the document would look if printed.

Rendering engine 630 can render a file by establishing or accessing a virtual printer in an operating system. The virtual printer can be configured (generally or for a specific instance) to print a defined type of document, such as a pdf or jpg file.

A rendered version of the file can include a rendered version of a structure file and can be included in a presentation generated by, transmitted via or presented via interface engine 610. One or more tools may further be provided (e.g., and identified in the presentation) that allow a user to identify a region of the rendered version of the file. For example, a tool may include a selection box that can be shaped, sized and/or positioned based on input received via a graphical user interface (e.g., to identify a region where a text response is to be provided). As another example, a tool can include a cursor tool that can be used to identify a point location (e.g., to identify a location where a selection may be indicated via a marking). As yet another example, a tool can include one that allows associating a defined response region and/or position with a particular data-segment identifier (e.g., question identifier).

Interface engine 610 can detect inputs (e.g., tool-usage inputs) identifying one of more data-segment specifications (e.g., a position, shape and/or size of a data-segment (e.g., response) area) and/or associating data-segment specifications with identifiers. Such input data can be used by a template engine 635 to define a template in association with a template identifier corresponding to the file. In some instances, interface engine 610 detects one or more inputs associated with one or more display pixels. The display pixel(s) can be transformed (e.g., by parsing engine 635) into one or more template locations (e.g., pixels, line identifiers, indent identifiers, etc.).

Template engine 635 can generate a template that includes data indicating how to locate each of one or more data segments in a content object. For example, a template (stored in a template data store 640) can associate an identifier of each of one or more data segments with one or more specifications, such as a position (e.g., a point position or region's corner or center position), a size (e.g., a length, a width or a radius) and/or a shape. Specifications may be defined along a coordinate system centered on page or page representation (such that (0,0) corresponds to a corner of a page or a corner margin or such that line numbers correspond to those on a page), or specifications may be defined with more relative relationships (e.g., indicating that Data Segment #1 is to have a size of [3,4] and to have a left corner that is [0,−0.25] relative to a bottom left corner of a corresponding data element (e.g., text block)).

Each electronic template stored in template data store 640 can be associated with a template identifier. The electronic template can identify, for each of a set of data segment identifiers, one or more segment-position specifications (e.g., which may identify an absolute or relative position of a data segment, such as a position of an edge, corner or center of the segment). The electronic template may further include a segment-size specification, such as a length and/or width of a segment. In some instances, a data segment identifier is associated which particular content and/or a content identifier. For example, Data Segment #1 may correspond to a region where a response to Question #1 is expected to be present. Thus, an identifier for Data Segment #1 can be associated with an identifier for Question #1 in a template. In some instances, content associated with the content identifier includes particular position and/or size specifications as well. Thus, for example, Question #1 may correspond with specifications indicating that a representation of such is 6 inches wide by 1.5 inches tall, and the template may indicate that a corresponding (e.g., answer) data segment is 3 inches tall and 6 inches wide and is to be directly beneath Question #1.

An electronic template may, but need not, identify an order of data segments and/or corresponding content and/or identifiers of content. An electronic template may be associated with a supervisor identifier, a date (e.g., a date at which one or more content objects that are to be evaluated based on the template are expected to be received), an identifier of each of one or more users and/or user devices (e.g., users and/or user devices expected to be associated with content objects corresponding to the template) and/or an identifier of a key that specifies how one or more data segments are to be assessed.

In some instances, record classifier 625 determines that a file received by file receiver 605 is a content object that is to be assessed based on data in a template. Record classifier 625 can then identify a template identifier associated with the content object, such that template engine 635 can retrieve the appropriate template data from template data store 640.

In one instance, this determination includes detecting a mark or code (e.g., a barcode, QR code, alphanumeric code, numeric code, image, etc.) on the content object and determining which template identifier is associated with the mark. The determination may also include a transformation (e.g., to transform the content object and/or the mark to have a defined size, resolution, orientation and/or file type).

Using the template identifier (e.g., a code), template engine 635 can query template data store 640 and retrieve template data corresponding to the template identifier. The retrieved data can include, for example, one or more position and/or size specifications for each of one or more data segments that are expected to be or may be present in the content object.

Using the specification(s), a parsing engine 645 can identify a portion of data in the content-object data that corresponds to a particular data segment. In one instance, the portion of data corresponds to one or a set of pixel values (e.g., intensity and/or color values). The pixel values can include values associated with pixels corresponding to position and/or size specifications for a data segment. It will be appreciated that alternative units may also be evaluated in addition to or instead of pixels. For example, specifications can be defined and/or content objects can be evaluated using a defined grid and/or coordinate system.

Parsing engine 645 can then extract the portion of data and associate the extracted portion with an identifier of a data segment corresponding to the data-segment specification(s). The quantity and/or characteristics of data extracted may be determined based on data-segment specification(s) in the template data and/or defined extraction parameters. For example, a data-segment specification may include a point location, and an extraction parameter may indicate that data within a defined radius from the point location is to be extracted.

Parsing engine can store object data in an electronic object record in an object data store 650. The object data can include, for example, the template identifier, one or more other identifiers associated with the template identifier (e.g., an identifier of a supervisor, supervisor device and/or course), an identifier of a user and/or user device associated with the content object, a date and/or, for each of one or more data segments, extracted data corresponding to the data segment.

In one instance, a single data structure can include electronic object records (corresponding to one, more or all data segments in the records) corresponding to each of multiple content objects (e.g., each associated with a same template identifier). In one instance, a separate data structure stores data for each content objet.

A response classifier 655 can assess each extracted data portion to identify a response as indicated in the portion. In some instances, response classifier 655 analyzes a set of intensity values to determine whether the portion included a mark indicative of a selection (e.g., whether a box was checked or bubble was filled in). Response classifier 655 can, for example, determine an intensity statistic for the portion (e.g., an average or median intensity, or a percentage of pixels having an intensity value over an absolute or relative defined threshold). In some instances, the intensity statistic is a relative statistic. For example, the statistic may include a ratio of an absolute intensity statistic for the portion (e.g., an average or median intensity in a content object) to an absolute intensity statistic for another portion of the content object or the content object in general (e.g., an average or median intensity across all pixels in a content object). Response classifier 655 may perform one or more image-processing techniques prior to calculating the intensity statistic, such as normalizing or skewing intensity values or smoothing intensity values within part or all of a portion.

Response classifier 655 can determine whether a selection was identified in a portion by, for example, comparing the intensity statistic to each of one or more thresholds. When it is determined that the statistic exceeds a threshold, it may be determined that a selection was made. In one instance, one or more thresholds can be used to make preliminary selection determinations. For example, if a statistic exceeds a high threshold, response classifier 655 may infer that a selection was made and determine that this inference is to be associated with a high evaluation quality metric. If the statistic is below a low threshold, response classifier 655 may infer that a selection was not made and determine that this inference is to be associated with a high evaluation quality metric. Meanwhile, if the statistic is between the low and high thresholds, response classifier 655 may determine that any inference is to be associated with a low evaluation quality metric. An evaluation quality metric scale may be, for example, discrete, binary, continuous, bounded (at one or both ends) and/or unbounded. For example, the metric may depend on an extent to which the statistic is below or above each of one or more thresholds.

In some instances, response classifier 655 interacts with interface engine 610 to identify a response. For example, an extracted data-segment portion can be presented (e.g., via a display on a supervisor device), and input can be detected that identifies the response. In various instances, an identifier of a corresponding template, user, user device, data-segment identifier, question and/or key data may, or may not, be concurrently presented. Thus, in one instance, the response-identification interaction can facilitate anonymous and/or unbiased scoring. In some instances, multiple data-segment portions can be concurrently presented (e.g., portions associated with different segments from a same content object or portions associated with a same segment and different content objects).

In some instances, response classifier 655 identifies one or more words, letters and/or numbers in a portion. Such identification can include executing a character-recognition technique. In some instances, such identification is performed across all or part of the content object, prior to extraction and/or storage of object data.

Response classifier 655 can store an identified response (e.g., an indication as to whether a selection was made, one or more words, one or more numbers and/or one or more letters) in a response data store 660. The response (e.g., one that is automatically detected or one identified based on input detected at interface engine 610) can be associated with, for example, an identifier of an object record, user, user device, data segment, and/or template. As one illustration, response data store 660 may include an array. One dimension of the array can identify a user or user device; and another can identify a data segment. For each user (or user device) and data segment, a response and evaluation quality metric can be identified in the array.

A scoring engine 665 can identify a score for each of one or more responses and/or response sets. In some instances, scoring engine 665 can evaluate each of one or more responses using key data stored in a key data store 670. Particular key data can be associated with a template identifier and/or data-segment identifier. The key data can identify, for example, a target data element (e.g., correct response) for a given data segment, which may include an indication as to whether a selection was to be made; and/or one or more words, letters and/or numbers were to be included a letter or number that were to be included in a response.

In some instances, a set of portions and/or responses are related. For example, each of a set of four portions may correspond to one of an A through D bubble for a single question. Such relationships can be inferred (e.g., based on relative positions of data segments, such that a relationship is inferred when the segments are separated by less than a threshold distance) and/or identified via input detected by interface engine 610 (e.g., received at a supervisor device). Template, object, response and/or key data may identify this relationship. For example, key data may indicate that a segment set includes data segments 1-4, and a target data element for the set is a selection made for segment 1 and not any of the others.

Scoring engine 665 can identify key data that corresponds to each response (or response set) and use the key data to score the response. The score for each response or response set may include a binary score (e.g., whether the response matches a target data element), a categorical score and/or a numeric score (e.g., reflecting a degree to which the response matches a target data element).

In some instances, scoring engine 665 interacts with interface engine 610 to identify a score for a response or response set. For example, an extracted data-segment portion and/or corresponding response (e.g., a printed version of detected text) can be presented (e.g., via a display on a supervisor device), and input can be detected that identifies whether (and/or an extent to which) the response corresponds to a target data element. In various instances, an identifier of a corresponding template, user, user device, data-segment identifier, question and/or key data (e.g., target data element) may, or may not, be concurrently presented. Thus, in one instance, the response-identification interaction can facilitate anonymous and/or unbiased scoring. In some instances, multiple data-segment portions can be concurrently presented (e.g., portions associated with different segments from a same content object or portions associated with a same segment and different content objects). The presentation can include scoring tools, such as a numeric input box that can accept numeric entry and/or selection (e.g., that is indicative of a score of a portion positioned next to the tool) and/or a selection button or box that can be selected to indicate that a response does (or does not) correspond to a target data element.

Scoring engine 665 can also identify a score for the overall content object based on scores for individual responses and/or response sets associated with the object. The object score can be, for example, numeric or categorical. In one instance, the object score is determined by summing scores for responses and/or response sets in the object. The sum can include a weighted sum, where key data identifies the weight to assign to individual responses or response sets. Determining the object score can further include comparing one or more numeric response and/or object scores to one or more thresholds. For example, various ranges between defined threshold may correspond to different categorical scores.

Scoring engine 665 can score response, response set and/or object scores in a score data store 675. Each score can be associated with, for example, an identifier of a corresponding template, user, user device, data-segment identifier, question and/or key data (e.g., target data element.

In some instances, scoring engine 665 can generate one or more population statistics pertaining to a data segment, data-segment set and/or content object. For example, scoring engine 665 may analyze a set of scores (e.g., object scores or response scores), each corresponding to a same data segment or data segment set, to determine an average, median, mode, range, extremum, or distribution.

Interface engine 610 may generate a variety of presentations based on actions performed by various components and/or data stored in various data stores. In one instance, a presentation can include an identifier of each of one or multiple users and one or more corresponding scores (e.g., an object score and/or one or more response scores). The user identifier can include, for example, a name or numeric identifier of the user. A same or different presentation can include, one or more responses, target data elements and/or population statistics.

To illustrate, a presentation can pertain to a single content object include—for each of a set of data segments—an identified response, a target data element and a response score. The presentation can also include an object score for the content object and a population statistic based on a set of corresponding object scores. The presentation may be sent to a user device (e.g., via a webpage, app and/or email) associated with the content object. As another example, a presentation can include an identifier of each of a set of users and, for each user, a response score assigned for each of a set of data segments and an object score. The presentation may be sent to a supervisor device that provided a structure file used to define a corresponding template. As yet another example, a presentation can include a distribution of each of one or more response scores and/or object scores. The presentation may be sent to a supervisor device associated with the content objects. In one instances, the presentation is presented while interface engine 610 is providing an interface at which one or more response scores can be identified, and the presentation can be dynamically updated as the scores are detected. This type of presentation can allow a supervisor to, for example, track a real-time distribution of scores being influenced by present scoring actions.

It will be appreciated that one or more of data stores 640, 650, 660, 670 and 675 may be combined. For example, a single data store can identify position and size specifications for a data segment, a target data element and—for each of a set of content objects—extracted data for the segment, an identified response and a determined score. Alternatively or additionally, one, more or all of data stores 640, 650, 660, 670 and 675 may be a relational data store.

Figure 7:
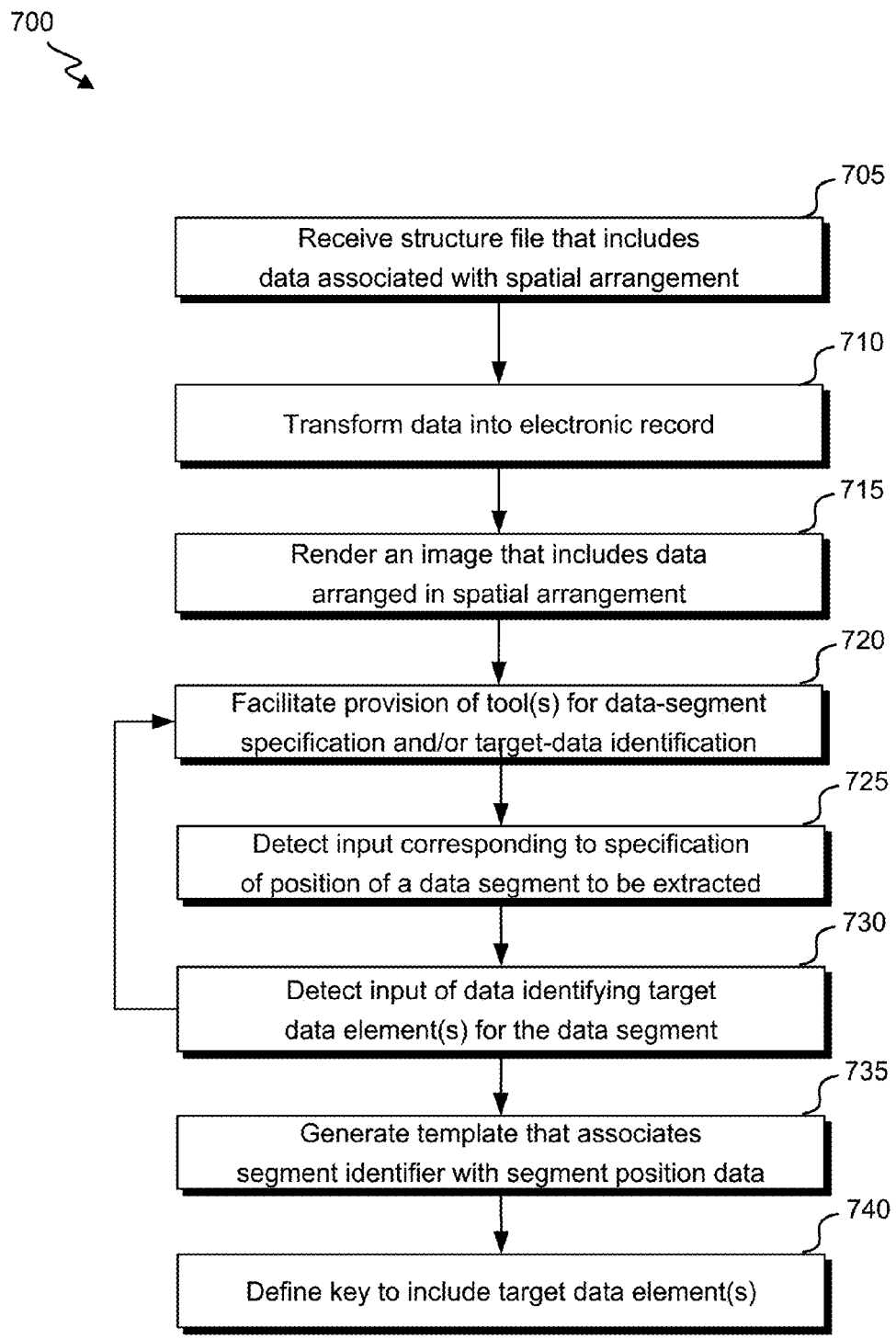
FIG. 7 illustrates a flowchart of an embodiment of a process for generating template data.

FIG. 7 illustrates a flowchart of an embodiment of a process 700 for generating template data. Process 700 may be performed, in part or in its entirety, at content management server(s) 102, user device 106, supervisor device 110, and/or one or more other device or server.

Process 700 begins at block 705 where file receiver 605 receives a structure file that includes structure-file data associated with a spatial arrangement. The structure file may be received, for example, from another device, from an application (e.g., used to generate and/or virtually print or save the structure file) and/or via upload. The structure file can include, for example, a scanned document or photo (e.g., taken by a camera at a supervisor device). The structure file can include on generated and/or detected at a supervisor device.

The structure-file data can include, for example, data that, when rendered, includes text (e.g., corresponding to one or more questions), a document header (e.g., identifying a course, supervisor and/or date), a document title, one or more target data elements, one or more answer bubbles (or other discrete answer elements), and/or an answer space (e.g., for a short answer or essay). The data, when rendered, may be presented in accordance with the spatial arrangement. For example, some of the text may be presented above some other of the text or a blank space. As another example, text may occupy distinct portions of a page the rendered file. The structure-file data may also include metadata and/or be associated with other data that identifies a supervisor device, course identifier, date and/or date.

At block 710, file transformation engine 620 transforms the structure-file data into an electronic record. The transformation can include, for example, a rotation, zoom adjustment, file conversion or skew or tilt adjustment. The transformation can be performed, for example, such that the transformed data (or rendered version thereof) has, for example, a particular dimension (e.g., width or height), orientation, skew, tilt, document type, and/or font size. In one instance, the transformation includes virtually printing the structure file to a particular file format (e.g., pdf, jpg or tif). Transforming the structure-file data into an electronic record can include an electronic manipulation (e.g., modifying, deleting part of or adding to) of the structure-file data. The transformation into an electronic record can include modifying the structure file (e.g., such that the electronic version includes a modified version of the structure file) and/or generating a new file.

At block 715, rendering engine 630 renders an image that includes the structure-file data arranged in the spatial arrangement. This rendering can include rendering an image of the transformed data. The rendering can include, for example, generating a representation of the data as part of a webpage or app page. Due to preservation of the spatial arrangement, the rendered image may have an appearance that matches or is similar to an appearance of part or all of the structure file. In some instances, the rendered image includes an image corresponding to a page of the structure file.

At block 720, interface engine 610 facilitates provision of one or more tools. Each of the one or more tools can include a virtual tool that can be used at a device interface so as to identify a data-segment specification (e.g., a position, dimension and/or shape of a data segment) and/or a target-data (e.g., correct answer) identification. The tool(s) may be provided, for example as part of a webpage, app page or software module. A visual representation and/or availed functionality of the tool(s) may, but need not, be present concurrently with the rendered image. One or more tools may be related and/or have a use dependency. For example, a tool that allows for a target data element to be identified may be availed upon detecting a new data-segment specification.

One exemplary tool includes a selection box (or other shape). Thus, use of the tool may include sizing and position the box over a portion of the rendered image. Such use may therefore be indicative of a position, size and shape of a data segment. Another exemplary tool includes a cursor tool. Use of the tool may include positioning a representation of the tool on a portion of the rendered image. Such use may therefore be indicative of a position of a data segment. Another exemplary tool includes a text tool that allows a user to enter characters. Yet another exemplary tool includes an answer-identifier tool that can allow a user to identify a position, data segment, response option, and so on that corresponds to a target data element.

At block 725, interface engine 610 detects an input corresponding to a specification of a position of a data segment to be extracted from content objects. In one instance, the input is detected locally (e.g., via detection of one or more mouse clicks, screen touches and/or key strokes). In one instance, the input is detected by receiving a communication from another device identifying the input or corresponding data. The input can include one provided via use of one or more of the tool(s). For example, the input can include sizing and positioning a selection box (e.g., and, in some instances, confirming the box position and size). The input can be associated with one or more positions, coordinates, pixel identifiers, etc. In some instances, the same or different input may corresponding to one or more other specifications of the data segment, such as a width, height, radius, and/or shape.

At block 730, interface engine 610 detects an input identifying one or more target data elements corresponding to the data segment. In one instance, the input is detected locally (e.g., via detection of one or more mouse clicks, screen touches and/or key strokes). In one instance, the input is detected by receiving a communication from another device identifying the input or corresponding data. The input can include an indication as to whether a selection was to have been made, which selection was to have been made, one or more words that were to have been entered, one or more numbers that were to have been identified, and so on. The input can include one provided via use of one or more of the tool(s). For example, the input can include one or more letters, numbers, characters and/or words entered via a text tool. As another example, the input can include a use of an answer-identifier tool that identifies a position of a correct answer.

In one instance, one or more same inputs can be indicative of a data-segment specification and target data element. For example, a selection box may be positioned and sized around a portion of the structure file that includes text. That text can be identified as the target data element, and the position and size of the box can be identified as specifications.

One, more or all of blocks 720-730 can be repeated so as to facilitate specification and target-data-element definitions for one or more other data segments to be associated with a structure file.

At block 735, template engine 635 generates a template that associates, for at least one data segment, an identifier for the data segment with segment position data corresponding to the position specification. For example, the segment position data can include a point position or a position of a center, edge or corner of the segment. The segment identifier may further be associated with other segment specifications, such as a width, height, radius and/or shape. The template may be associated with, for example, a template identifier, template name, supervisor name, identifier of a supervisor device, user name and/or identifier of a user device.

At block 740, scoring engine 665 defines a key to include one or more of the identified target data element. The key can associate each target data element with a segment identifier. The key may also identify, for each segment identifier, scoring scale features, such as a minimum and/or maximum score for the data segment and/or a score discretization. The key can be associated with a key identifier, template identifier, key name, supervisor name, identifier of a supervisor device, user name and/or identifier of a user device. In some instances, a single data structure associates a segment identifier with segment position data and with a target data element.

The key and/or template may further include additional information and/or data pertaining to data segments. For example, a corresponding question and/or question identifier may be identified.

Figure 8:
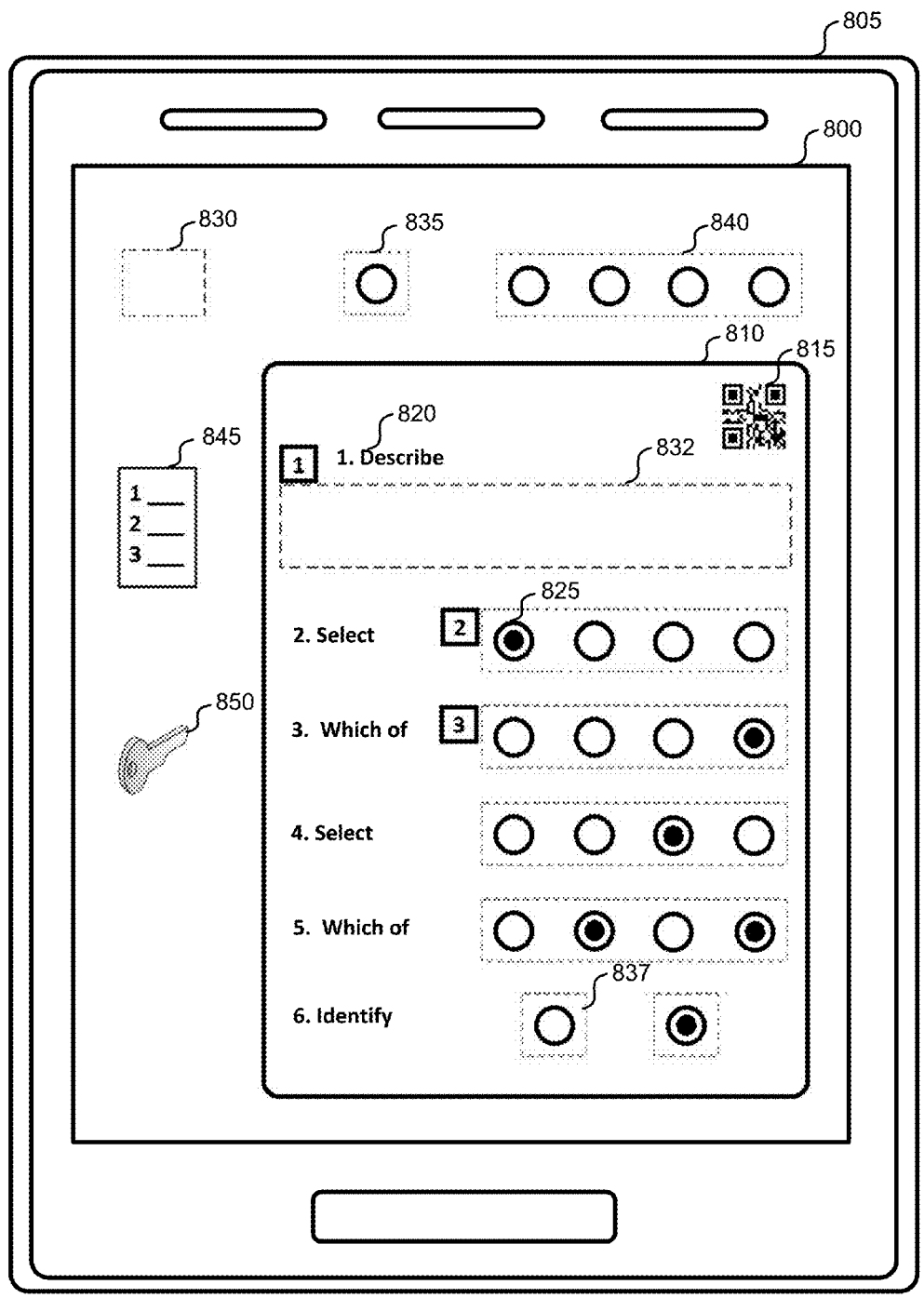
FIG. 8 illustrates an exemplary presentation with a rendered structure-file image and specification-defining tools.

FIG. 8 illustrates an exemplary presentation 800 with a rendered structure-file image and specification-defining tools. Presentation 800 can include one presented on a device 805, such as a supervisor device. Presentation 800 includes a rendered image 810 structure-file data. Rendered image 810 can have a rectangular shape and/or dimensions with proportions corresponding to that of a page, sheet of paper and/or display screen.

Rendered image 810 includes a template identifier 815 that is, in the depicted instance, a QR code. Rendered image 810 further includes structure-file data, which can include text 820 (e.g., corresponding to questions), graphics, and so on. The structure-file data can further include response options or areas, such as one or more answer bubbles 825.

Presentation 800 can include one or more specification-defining tools. For example, a selection-box tool 830 can be provided, which can be positioned and sized to define a position and size of a data segment. To illustrate, a manipulated section box 832 can indicate what position and size specifications are to define what portion of corresponding content-object data is to be extracted for a first data segment. Another illustrative tool is an answer-option tool, such as a single answer-option tool 835 and a multiple answer-option tool 840.

Single answer-option tool 835 can be used to identify a position of an answer choice. For example, upon engaging the tool, input (e.g., a mouse click) can identify a center position of an answer choice. To illustrate, a positioned single answer-option box 837 identifies a position of a potential marking. In some instances, the tool can further be used to define a size of an area to be considered to determine whether the answer choice was marked.

Multiple answer-option tool 840 can be used to more efficiently identify positions of multiple answer choices. In some instances, an interaction with the tool can specify a number of answer choices per row and/or a number of rows. Various inter-answer-choice spacing and/or size controls may also be available.

A segment identification tool 845 may be configured to allow various segment specifications to be tagged with an identifier of particular data segments. To illustrate, manipulated section box 832 can be tagged with segment identifier "1".

A key or scoring tool 850 can also be provided to allow a target data element to be identified. For example, key tool 850 can be used to identify which answer options are to be selected.

Figure 9:
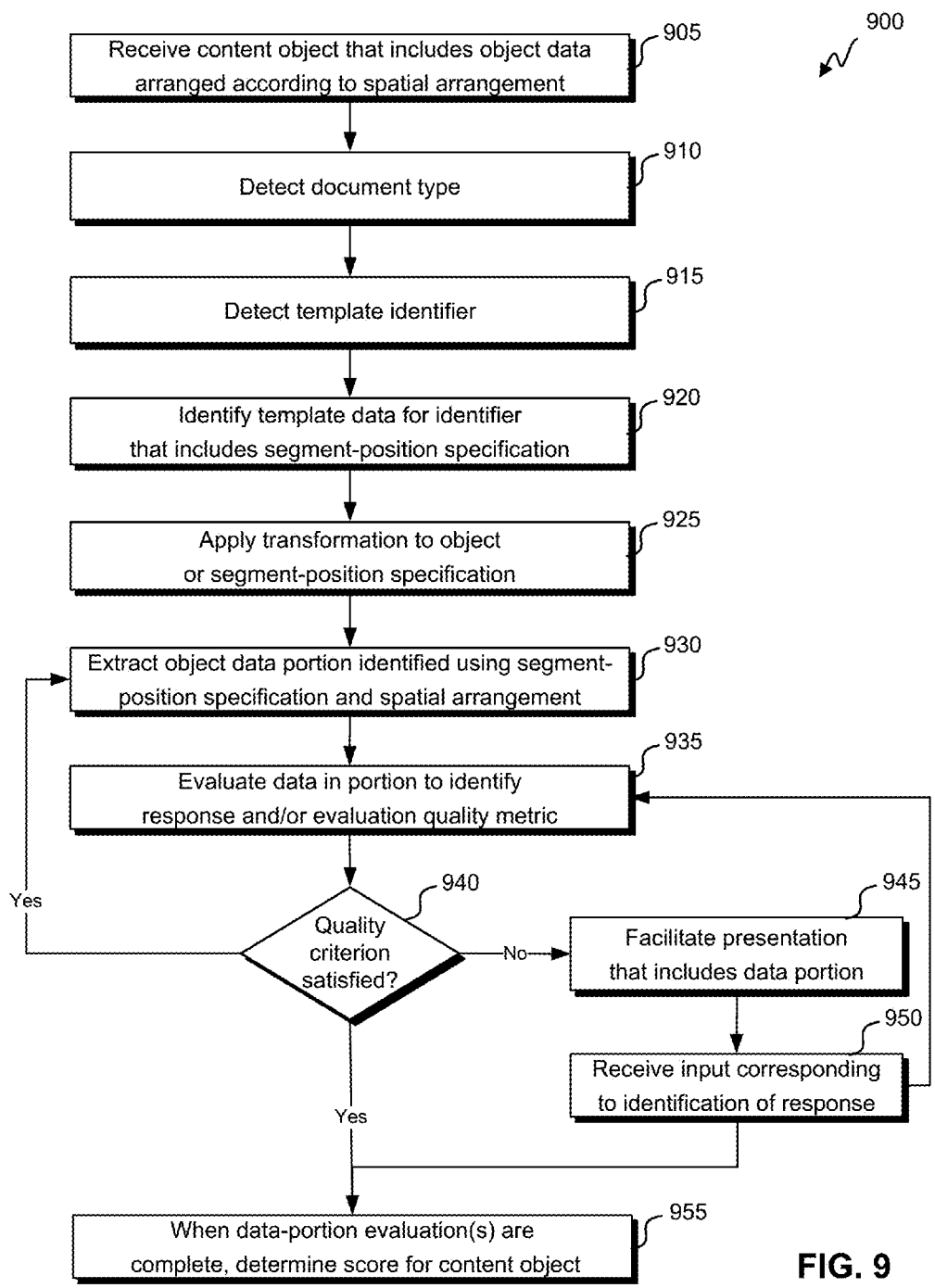
FIG. 9 illustrates a flowchart of an embodiment of a process for identifying and scoring responses detected in content objects.

FIG. 9 illustrates a flowchart of an embodiment of a process 900 for identifying and scoring responses detected in content objects. Process 900 may be performed, in part or in its entirety, at content management server(s) 102, user device 106, supervisor device 110, and/or one or more other device or server.

Process 900 begins at block 905 where file receiver 605 receives a content object that includes data arranged according to a spatial arrangement. The data can include, for example, data corresponding to user-identified entries. For example, the data can correspond to hand-written letters, numbers, words, characters and/or selections (e.g., bubble filling). As another example, the data can correspond to letters, numbers, words, characters and/or selections identified at a user device.

The spatial arrangement of the data can include, for example, relative positions of data portions (e.g., such that a user selection of option "A" is above another user selection of option "C"); positions relative to a specification of a content object (e.g., such that a user specification of "Rocky Mountains" is one-quarter of the way down a page in the content object); and/or positions relative to other data (e.g., such that a user entry of "46" is next to content associated with Question 6).

At block 910, record classifier 625 detects a document type for the content object. For example, record classifier may identify the content object as being an image file, a particular type of image file, a word-processing file, a particular type of word-processing file, a portable document file, etc. The detection can be performed, for example, by identifying an extension of the content object, pertinent metadata for the content object and/or a source from which the content object was received (e.g., a source device or application).

At block 915, record classifier 625 detects a template identifier for the content object. For example, record classifier 625 may detect a mark or code included in the object data and/or may detect input received in association with the content object. For example, the input may identify a content object type that is being uploaded. In some instances, a template identifier can be determined based on, for example, metadata associated with the content object and/or other stored data. For example, account data for a user may identifier a course or group that the user is involved in, and such information (e.g., in combination with identification of a time, location, document type and/or other information) may be used to identify the template identifier.

At block 920, template engine 635 identifies template data associated with the template identifier. Such identification can include, for example, querying template data store 640 with the template identifier. The template data can include, for example, one or more segment-position and/or segment-size specifications for each of one or more data segments. Each specification can include, for example, one or more coordinates, distances, lengths, and/or widths according to a defined coordinate system and/or unit of measure.

At block 925, transformation engine 620 applies a transformation to part or all of the content object and/or to the segment-positions. The transformation can be performed, for example, to adjust or reduce a skew or tilt and/or to change an orientation, zoom, size, and/or file type to matched a defined value and/or type and/or to match that of other data (e.g., object data or template data). For example, it may be detected (e.g., based on detection of a template identifier and/or object characters), that an object is rotated 10 degrees and is at 74% zoom. A transformation and zoom adjustment of the object can be performed to arrive at a target orientation and zoom, such as a 0 degree orientation and 100% zoom, or a transformation and zoom adjustment of one or data specifications (defined in accordance with a base orientation and zoom) to match the 10 degree orientation and 74% zoom. When the object is transformed, the transformation can be applied in a manner that preserves relative spatial arrangement of the object data. It will be appreciated that other types of processing may additionally or alternatively performed, such as normalization or adjustment of contrast or intensity values.

At block 930, parsing engine 645 extracts a portion of the object data using one or more of the segment-position specifications included in the template data. It will be appreciated that the extraction can be performed using transformed specifications and/or transformed template data. Extracted data can include, for example, a collection of intensities and/or color values of object units (e.g., pixels), letters, characters, numbers, words, etc.

In one instance, a defined size, dimension and/or shape parameter exists for extraction, and the portion corresponds to the parameter. For example, a parameter may indicate that data, centered on a data-segment position, and that is within a 20-by-20 square pixel region is to be extracted. In one instance, template data includes a size, dimension and/or shape parameter applicable to extraction (e.g., for data corresponding to all segments identified in the template data, for a particular subset or to a single segment).

At block 935, response classifier 655 evaluates the object data in the portion to identify a response and/or evaluation quality metric. The evaluation can include, for example, determining whether a selection was made (e.g., whether a bubble was filed or box was checked); identifying which selection was made (e.g., identify which bubble(s) were filled); identifying one or more words, numbers, letters or characters included in the data; and/or determining whether one or more particular words, numbers, letters or characters were included in the data. The analysis can include, for example, smoothing of intensity values, character recognition, word recognition, determining one or more intensity statistics and/or one or more threshold comparisons.

An evaluation quality metric can be determined by, for example, generating a match score that reflects a degree to which one or more pixel intensities and/or character combinations match a target statistic, word or number. As another example, the quality metric can reflect which thresholds are exceeded by a statistic (e.g., a pixel-intensity statistic) and/or a degree to which one or more thresholds are (or are not) exceeded.

At block 940, response classifier 655 determines whether a quality criterion is satisfied. The quality criterion can include a prescribed criterion that may be defined, for example, for a particular template, supervisor device, supervisor or may be generally applicable. In one instance, the criterion is defined at least in part based on input. The quality criterion may include a threshold and/or threshold or range identification. For example, the criterion may indicate that the criterion is not satisfied when a statistic falls within an intermediate range.

When the criterion is not satisfied, process 900 proceeds to block 945 where interface engine 610 facilitates a presentation that includes the portion of data, For example, a presentation or data for a presentation can be transmitted to another device (e.g., a supervisor device) and/or the presentation can be locally presented. The presentation can include the extracted data, which may correspond to one or more actual or potential markings in or near an answer-choice bubble, a short-answer space or an essay space. The presentation may include one or multiple data portions (e.g., corresponding to those associated with a same content object or those associated with a same data segment). The presentation may include presentation of one or more tools that allow entry of input to identify, for example, whether an answer was marked, what one or more words or numbers are, one or more scores and/or whether a response having been identified at block 935 was to be revised.

At block 950, interface engine 610 receives input corresponding to identification of the response. For example, the input may be locally detected or included in a communication received from another device. The input may identify the response and/or indicate that a response having been identified at block 935 is confirmed or is to be changed.

One or more of blocks 930-950 can be repeated and/or performed for multiple data segments and/or content objects. For example, blocks 930-935 may be performed for all data segments in a content object (or set of received content objects) before performing one or more of blocks 940-950. Upon having identified responses for a defined number of data segments in an object (e.g., via the evaluation performed at block 935 and/or via received input), process 900 continues to block 955 where scoring engine 665 determines a score for each of one or more responses and/or the content object. The score can be determined, for example, by comparing responses to corresponding target elements identified in a key. In some instances, individual responses are scored and a score for the content object includes a weighted or unweighted sum of the response scores.

Figure 10:
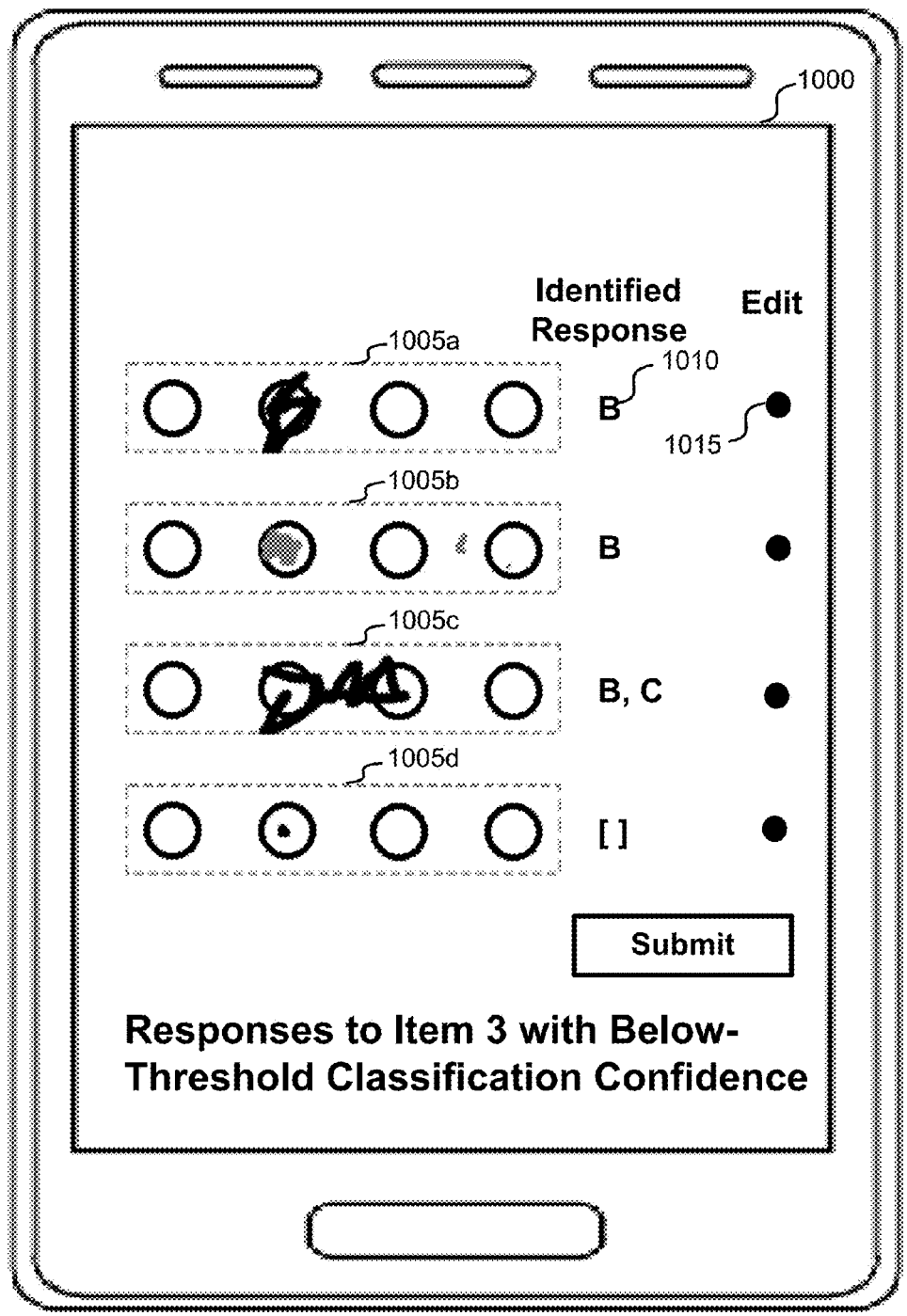
FIG. 10 illustrates an exemplary presentation with multiple data portion representations.

FIG. 10 illustrates an exemplary presentation 1000 with multiple data portion representations 1005a-1005d. In the depicted instance, each of data portion representations 1005a-1005d correspond to data portion associated with evaluation quality metrics that did not support satisfaction of an evaluation criterion. Further, each portion corresponds to a same data segment (e.g., and a different content object). In the depicted instance, a response (e.g., response 1010) was nonetheless automatically identified for each portion, indicating which (if any) answer choices were marked. Presentation 1000 also includes a response indication tool 1015, which can accept input that identifies a target data element and/or whether a response having been automatically detected is confirmed, rejected or is to be modified.

Figure 11:
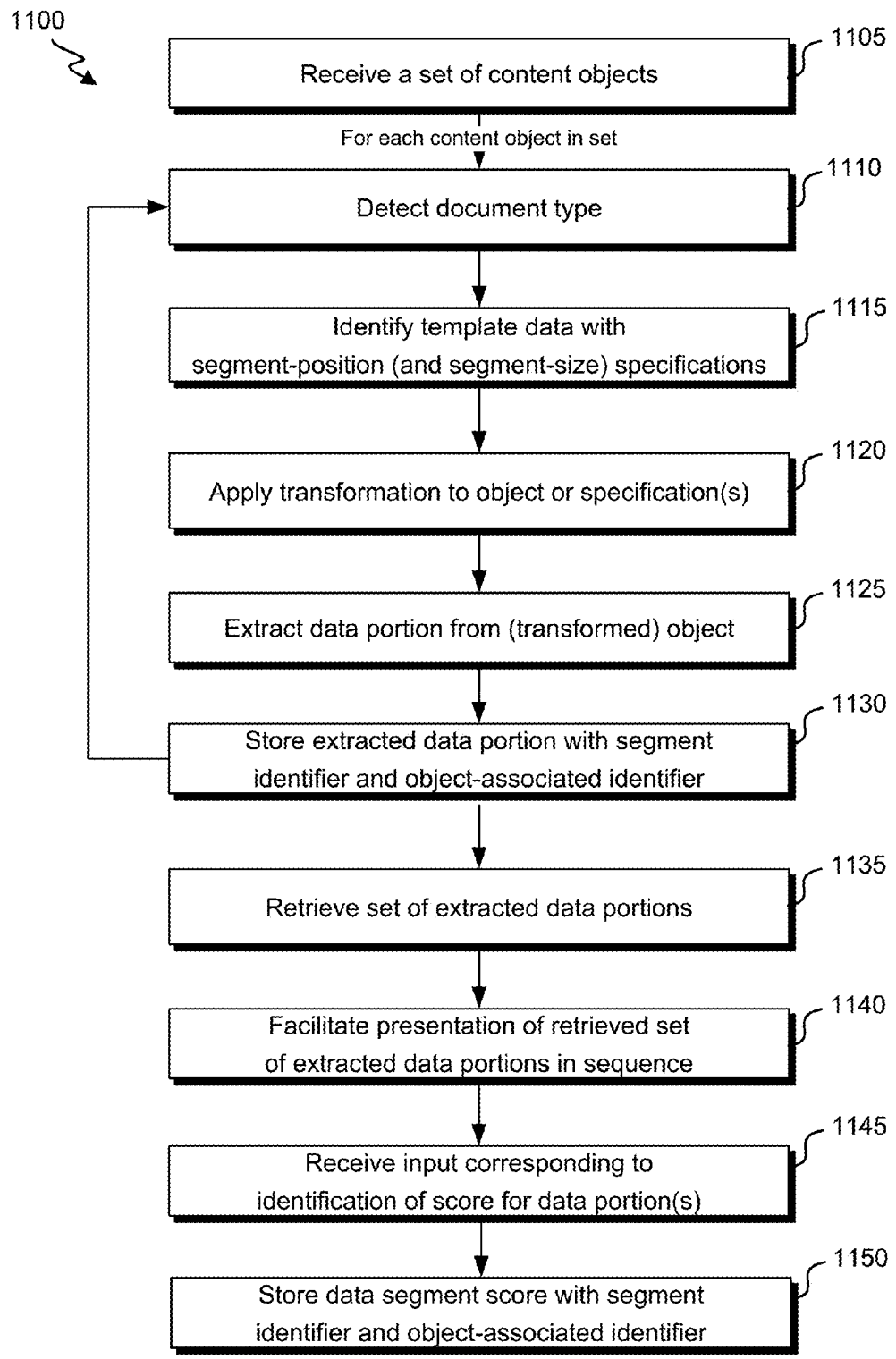
FIG. 11 illustrates a flowchart of an embodiment of a process for identifying and scoring responses detected in content objects.

FIG. 11 illustrates a flowchart of an embodiment of a process 1100 for identifying and scoring responses detected in content objects. Process 1100 may be performed, in part or in its entirety, at content management server(s) 102, user device 106, supervisor device 110, and/or one or more other device or server. Some actions in process 1100 can parallel those in process 900 shown in FIG. 9.

Process 1100 begins at block 1105 where file receiver 605 receives a set of content objects (e.g., concurrently or separately). Each object can be associated with an identifier, which may be an identifier of the object (e.g., so as to distinguish objects from each other within the set), an identifier of a user corresponding to the object (e.g., a user name or user-associated code) or an identifier of a user device associated with the object. The identifier may be, for example, detected based on markings in the object (e.g., a hand-written or typed user name on the object), input (e.g., provided at a user or supervisor device), and/or metadata associated with the object. Each object may also be associated with a same template identifier or otherwise have been indicated (e.g., via received input) to correspond to a same template.

One, more of blocks 1110-1130 can be performed with respect to each content object in the set. Blocks 1110-1125 can parallel corresponding actions described in relation to blocks 910-930 from process 900 shown in FIG. 9.

At block 1130, parsing engine 645 can store the extracted data portion in association with an identifier of a data segment and/or the object-associated identifier. In some instances, the storage is conditioned. For example, data portions may be stored only when they are associated with evaluation quality metrics below a threshold and/or when it is determined (e.g., based on evaluation quality metrics) that a quality criterion has not been satisfied. Data portions may also be stored in association with corresponding evaluation quality metrics. In some instances, all data portions (or all data portions of a given type, such as portions expected to include hand-written characters, such as those associated with short answers or essays) are stored. In some instances, data portions are evaluated to identify corresponding responses, and stored data portions may also be associated with the responses.

At block 1135, response classifier 655 (e.g., via parsing engine 645) retrieves a set of extracted data portions. The set may include content object portions associated with a similar evaluation quality metric (e.g., below a defined threshold), a similar or same result of evaluating a quality criterion (e.g., the criterion not being satisfied), a same object-associated identifier and/or a same segment identifier. For example, the set may include all portions for the set associated with Segment Identifier #4 and for which a quality criterion pertaining to automated response detection was not satisfied.

At block 1140, interface engine 610 facilitates a presentation of some or all of the retrieved set of data portions. In some instances (but not in others), at least two data portions are presented concurrently. In some instances (but not in others), at least one data portion is presented after at least one other data portion. A spatial or temporal sequence or order of the presentation may be determined based on, for example, a pseudo-random technique, an evaluation quality metric, an object-associated identifier and/or a segment identifier. For example, all portions to be presented that are associated with Data Segment Identifier #1 may be presented prior to those associated with Data Segment Identifier #2. The presentation may further include representation of one or more tools that may allow a reviewer (e.g., supervisor) to identify a response in the portion and/or a score in the portion. For example, a tool may be provided to receive input indicating whether a response matched a target data element and/or a numeric score for the portion.

At block 1145, interface engine 610 receives (e.g., locally or within a received communication) input corresponding to a score for each of one or more data portions. For example, the score may include a binary and/or numeric score. In some instances, one or more notes may further be received (e.g., to justify the score).

At block 1150, scoring engine 665 stores data-portion scores in association with corresponding segment identifiers and object-associated identifiers. For example, the set of content objects may include 15 objects, and 9 data portions may be extracted from each object. Of those 9 portions, 4 may include portions expected to include text data and can therefore be presented for scoring. One or more inputs may identify a score (e.g., a binary or numeric score) for at least some or all of these 60 text portions, and each score can be stored in association with a segment identifier and object identifier associated with the score. In some instances, object-associated identifiers can be hidden, such that they are not included in the presentation(s) so as to promote unbiased scoring.

Figure 12:
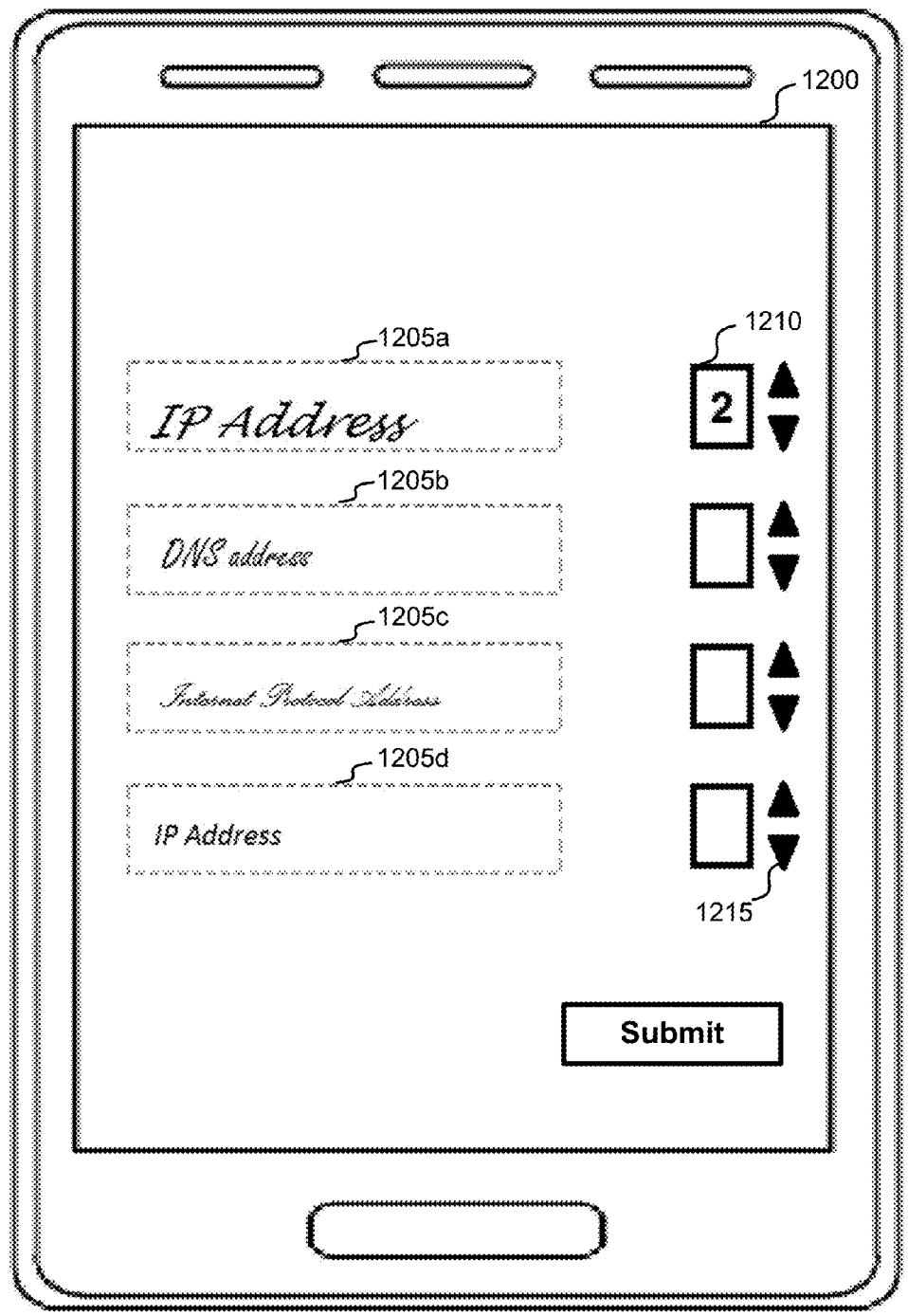
FIG. 12 illustrates an exemplary presentation with multiple data portion representations.

FIG. 12 illustrates an exemplary presentation 1200 with multiple data portion representations 1205a-1205d. In one instance, data portion representations 1205a-1205d may not have been evaluated to automatically identify a response and/or response score. Rather, extracted data portions may be succinctly presented so as to facilitate efficient scoring of the portions. In the depicted instance, each data portion representation 1205a-1205d corresponds to a same data segment but a different content object.

One or more scoring tools can be provided, such as a score-entry tool 1210 that can receive a numeric entry that is to be assigned as a score for a corresponding data portion response and/or a score-adjustment tool 1215 that can allow input to indicate whether a score for a corresponding data portion response is to be adjusted up or down (e.g., in a defined increment).

Figure 13:
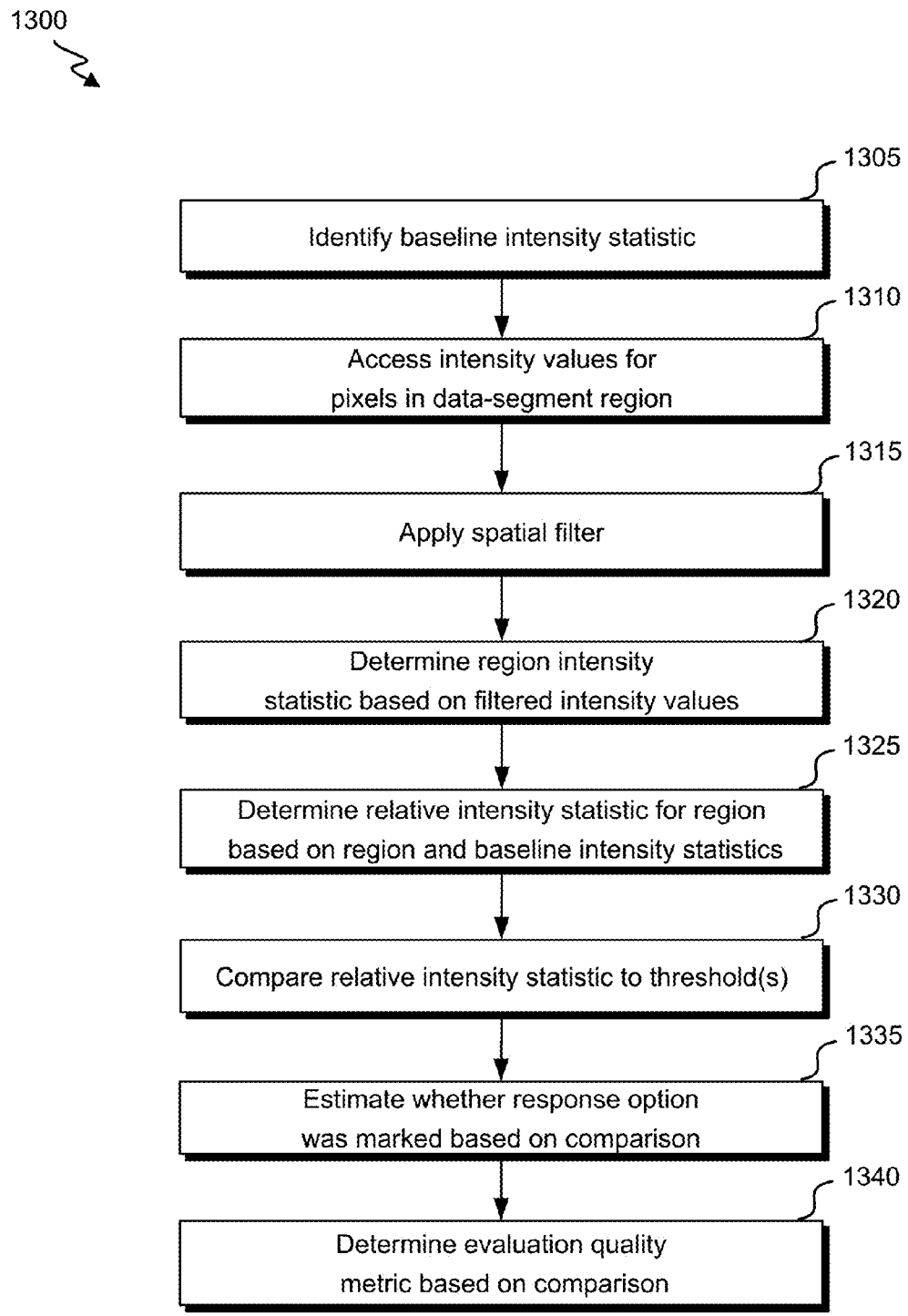
FIG. 13 illustrates a flowchart of an embodiment of a process for detecting responses and evaluation quality metrics.

FIG. 13 illustrates a flowchart of an embodiment of a process 1300 for detecting responses and evaluation quality metrics. Process 1300 may be performed, in part or in its entirety, at content management server(s) 102, user device 106, supervisor device 110, and/or one or more other device or server. Process 1300 may be performed by response classifier 655 on one or more devices or servers. Process 1300 may be used to assess whether and/or which selection was made, which can include (for example) determining whether an answer bubble is filled, box is marked, etc.

Process 1300 begins at block 1305 where a baseline intensity statistic is identified. The baseline intensity statistic can include, for example, an average, median, mode or point along a distribution (e.g., an intensity at which 20% of intensity values are below the intensity). The baseline intensity statistic can be determined, for example, based on all intensity values associated with a content object, all intensity values associated with one, more or all data-segment portions, another part of a content object (e.g., along the edges or in a corner).

At block 1310, a set of intensity values (e.g., associated with pixels) in an object portion is identified. The portion can include one with a center, corner or edge as defined according to an object-position specification and/or with a dimension and/or shape as defined according to an object-size specification or defined value (e.g., defined based on supervisor input). The intensity values can, in some instances, include those having been transformed and/or otherwise processed.

At block 1315, a spatial filter can be applied (e.g., to smooth) to process the intensity values. For example, neighborhood operations (e.g., to compute a maximum, minimum, median, average or other statistic) or smoothing operation can be implemented. In some instances, the spatial filter can be applied to the content document as a whole (or a page of the content object), to reduce edge complications that would otherwise be experienced by processing individual portions. Other types of filtering may alternatively or additionally be performed At block 1320, a region intensity statistic is determined based on the filter intensity values. The region intensity statistic can include, for example, an average, median, mode or point along a distribution. In one instance, the type of statistic of the region intensity statistic is the same as the type of statistic of the baseline intensity statistic.

At block 1325, a relative intensity statistic is determined for the region based on the region and baseline intensity statistics. For example, the relative intensity statistic can include a difference between or ratio of the statistics.

At block 1330, the relative intensity statistic is compared to one or more thresholds. The thresholds can include fixed thresholds, thresholds defined based on input (e.g., from a supervisor device, a threshold applicable to a type of data segment, content object or user, etc. In some instances, at least one threshold is set such that it is to be concluded that an answer was marked when the relative intensity statistic is above the threshold, and/or at least one threshold is set such that it is to be concluded that an answer was not marked when the relative intensity statistic is below the threshold. These thresholds may, but need not, be the same. For example, when they are different, an intermediate range may exist, indicating an uncertainty as to whether an answer was marked. In some instances, the intermediate range may be divided to reflect, for example, different estimations as to response markings.

At block 1335, an estimate is made, based on the comparison, as to whether the a response option was marked. For example, it may be estimated that a response option (e.g., corresponding to the data-segment region) is marked when the relative intensity statistic exceeds a particular threshold.

At block 1340, an evaluation quality metric is determined based on the comparison. For example, a relationship may relate the evaluation quality to metric to an extent to which the relative intensity statistic exceeds one or more thresholds. The relationship may be u-shaped and/or include a computation such as an absolute value or squaring of a difference between the relative intensity statistic and a threshold, as a large positive or negative difference may correspond to high confidence in the estimate.

It will be appreciated that techniques, computations, conditions, parameters, thresholds, keys and/or other analysis features may be determined, at least in part, based on input (e.g., from a supervisor) and/or based on a machine learning technique. For example, a threshold or technique for determining evaluation quality metrics or a quality criterion can be determined by evaluating characteristics pertaining to automatically identified responses that matched (or differed from) responses identified based on subsequent input. Thus, techniques, computations, conditions, parameters, thresholds, keys and/or other analysis features may be dynamic.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction (s) and/or data.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A system for assessing extracted portions of content objects, the system comprising:
   one or more data processors; and
   a non-transitory, computer-readable storage medium containing instructions which when executed on the one or more data processors, cause the one or more data processors to perform actions including:
      detecting a set of assessment content objects for processing, each assessment content object of the set of assessment content objects including content-object data arranged according to a spatial arrangement, each assessment content object of the set of assessment content objects being associated with an identifier corresponding to a student;
      for each assessment content object of at least some of the set of assessment content objects:
         determining that the assessment content object corresponds to an identifier of a template for a particular assessment, the template identifying segment-position specification that at least partly defines an area in which an answer for a question is to have been provided;
         identifying a portion of the content-object data as corresponding to an answer area for the question based on the segment-position specification and the spatial arrangement;
         extracting the portion of the content-object data;
         identifying an answer indicated in the portion of the content-object data based at least partly on generating a first statistic corresponding to the portion of the content-object data and comparing the first statistic to one or more thresholds; and
         generating a score to be associated with the assessment content object based at least partly on the answer indicated in the portion of the content-object data, the score indicative as to whether the answer was accurate;
      aggregating the scores associated with the at least some of the set of assessment content objects;
      generating a second statistic based on the aggregated scores; and
      facilitating a presentation of the second statistic as indicative of accuracies of the answers indicated in the portions of the content-object data from at least some of the set of assessment content objects.

2. The system for assessing extracted portions of content objects as recited in claim 1, wherein, for an assessment content object of the at least some of the set of assessment content objects:
   identifying the answer indicated in the portion includes converting the extracted portion of the content-object data to text; and
   generating the score includes automatically assessing the text.

3. The system for assessing extracted portions of content objects as recited in claim 1, wherein, for an assessment content object of the at least some of the set of assessment content objects:
   identifying the answer indicated in the portion of the content-object data includes automatically evaluating the portion of the content-object data to identify the answer.

4. The system for assessing extracted portions of content objects as recited in claim 1, wherein the set of assessment content objects is larger than the at least some of the set of assessment content objects, and wherein the actions further include:
   for another assessment content object of the set of assessment content objects:
      determining that the assessment content object corresponds to an identifier of a template for a particular assessment, the template identifying segment-position specification that at least partly defines an area in which an answer for a question is to have been provided;
      identifying a portion of the content-object data as corresponding to an answer area for the question based on the segment-position specification and the spatial arrangement;
      extracting the portion of the content-object data; and
      identifying an answer indicated in the portion of the content-object data; and
      generating a score to be associated with the assessment content object based at least partly on the answer;
   re-aggregating the scores associated with the at least some of the set of assessment content objects and the score associated with the other assessment content object;

generating an updated statistic based on the re-aggregated scores; and facilitating an updated presentation of the updated statistic.

5. The system for assessing extracted portions of content objects as recited in claim 1, wherein the facilitating the presentation of the second statistic includes:

facilitating the presentation of the second statistic on an interface that includes an input field to accept an input characterizing an extracted portion of content-object data from another assessment content object, the input being configured to influence a score to be associated with the other assessment content object.

6. The system for assessing extracted portions of content objects as recited in claim 1, wherein the second statistic includes an average, median, mode, range, extremum, or distribution of the scores.

7. The system for assessing extracted portions of content objects as recited in claim 1, wherein the score includes a score for the answer.

8. A computer-implemented method for assessing extracted portions of content objects, the method comprising:

detecting a set of assessment content objects for processing, each assessment content object of the set of assessment content object s including content-object data arranged according to a spatial arrangement, each assessment content object of the set of assessment content objects being associated with an identifier corresponding to a student;

for each assessment content object of at least some of the set of assessment content objects:

determining that the assessment content object corresponds to an identifier of a template for a particular assessment, the template identifying segment-position specification that at least partly defines an area in which an answer for a question is to have been provided;

identifying a portion of the content-object data as corresponding to an answer area for the question based on the segment-position specification and the spatial arrangement;

extracting the portion of the content-object data;

identifying an answer indicated in the portion of the content-object data based at least partly on generating a first statistic corresponding to the portion of the content-object data and comparing the first statistic to one or more thresholds; and generating a score to be associated with the assessment content object based at least partly on the answer indicated in the portion of the content-object data, the score indicative as to whether the answer was accurate;

aggregating the scores associated with the at least some of the set of assessment content objects;

generating a second statistic based on the aggregated scores; and facilitating a presentation of the second statistic as indicative of accuracies of the answers indicated in the portions of the content-object data from at least some of the set of assessment content objects.

9. The computer-implemented method for assessing extracted portions of content objects as recited in claim 8, wherein, for an assessment content object of the at least some of the set of assessment content objects:

identifying the answer indicated in the portion includes converting the extracted portion of the content-object data to text; and generating the score includes automatically assessing the text.

10. The computer-implemented method for assessing extracted portions of content objects as recited in claim 8, wherein, for an assessment content object of the at least some of the set of assessment content objects:

identifying the answer indicated in the portion of the content-object data includes automatically evaluating the portion of the content-object data to identify the answer.

11. The computer-implemented method for assessing extracted portions of content objects as recited in claim 8, wherein the set of assessment content objects is larger than the at least some of the set of assessment content objects, and wherein the method further comprises:

for another assessment content object of the set of assessment content objects:

determining that the assessment content object corresponds to an identifier of a template for a particular assessment, the template identifying segment-position specification that at least partly defines an area in which an answer for a question is to have been provided;

identifying a portion of the content-object data as corresponding to an answer area for the question based on the segment-position specification and the spatial arrangement;

extracting the portion of the content-object data; and identifying an answer indicated in the portion of the content-object data; and generating a score to be associated with the assessment content object based at least partly on the answer;

re-aggregating the scores associated with the at least some of the set of assessment content objects and the score associated with the other assessment content object;

generating an updated statistic based on the re-aggregated scores; and facilitating an updated presentation of the updated statistic.

12. The computer-implemented method for assessing extracted portions of content objects as recited in claim 8, wherein facilitating the presentation of the second statistic includes:

facilitating the presentation of the second statistic on an interface that includes an input field to accept an input characterizing an extracted portion of content-object data from another assessment content object, the input being configured to influence a score to be associated with the other assessment content object.

13. The computer-implemented method for assessing extracted portions of content objects as recited in claim 8, wherein the second statistic includes an average, median, mode, range, extremum, or distribution of the scores.

14. The computer-implemented method for assessing extracted portions of content objects as recited in claim 8, wherein the score includes a score for the assessment content object.

15. A computer-program product tangibly embodied in a non-transitory, machine-readable storage medium, including instructions configured to cause one or more data processors to perform actions including:

detecting a set of assessment content objects for processing, each assessment content object of the set of assessment content objects including content-object data arranged according to a spatial arrangement, each assessment content object of the set of assessment content objects being associated with an identifier corresponding to a student;

for each assessment content object of at least some of the set of assessment content objects:
- determining that the assessment content object corresponds to an identifier of a template for a particular assessment, the template identifying segment-position specification that at least partly defines an area in which an answer for a question is to have been provided;
- identifying a portion of the content-object data as corresponding to an answer area for the question based on the segment-position specification and the spatial arrangement;
- extracting the portion of the content-object data;
- identifying an answer indicated in the portion of the content-object data based at least partly on generating a first statistic corresponding to the portion of the content-object data and comparing the first statistic to one or more thresholds; and
- generating a score to be associated with the assessment content object based at least partly on the answer indicated in the portion of the content-object data, the score indicative as to whether the answer was accurate;

aggregating the scores associated with the at least some of the set of assessment content objects;

generating a second statistic based on the aggregated scores; and facilitating a presentation of the second statistic as indicative of accuracies of the answers indicated in the portions of the content-object data from at least some of the set of assessment content objects.

16. The computer-program product as recited in claim 15, wherein, for an assessment content object of the at least some of the set of assessment content objects:
identifying the answer indicated in the portion includes converting the extracted portion of the content-object data to text; and
generating the score includes automatically assessing the text.

17. The computer-program product as recited in claim 15, wherein, for an assessment content object of the at least some of the set of assessment content objects:
identifying the answer indicated in the portion of the content-object data includes automatically evaluating the portion of the content-object data to identify the answer.

18. The computer-program product as recited as recited in claim 15, wherein the set of assessment content objects is larger than the at least some of the set of assessment content objects, and wherein the actions further include:

for another assessment content object of the set of assessment content objects:
- determining that the assessment content object corresponds to an identifier of a template for a particular assessment, the template identifying segment-position specification that at least partly defines an area in which an answer for a question is to have been provided;
- identifying a portion of the content-object data as corresponding to an answer area for the question based on the segment-position specification and the spatial arrangement;
- extracting the portion of the content-object data; and
- identifying an answer indicated in the portion of the content-object data; and
- generating a score to be associated with the assessment content object based at least partly on the answer;

re-aggregating the scores associated with the at least some of the set of assessment content objects and the score associated with the other assessment content object;

generating an updated statistic based on the re-aggregated scores; and facilitating an updated presentation of the updated statistic.

* * * * *